US008989779B1

(12) United States Patent
Centore, III

(10) Patent No.: US 8,989,779 B1
(45) Date of Patent: Mar. 24, 2015

(54) VENUE-BASED DEVICE CONTROL AND DETERMINATION

(75) Inventor: Michael A. Centore, III, Dunellen, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 1738 days.

(21) Appl. No.: 11/976,674

(22) Filed: Oct. 26, 2007

(51) Int. Cl.
*H04W 24/00* (2009.01)

(52) U.S. Cl.
USPC .................. 455/456.3; 455/456.1; 455/456.2; 455/456.4; 455/456.5; 455/456.6

(58) Field of Classification Search
USPC .............................. 455/456.1–456.3; 307/1–8
See application file for complete search history.

(56) References Cited

U.S. PATENT DOCUMENTS

| | | | | |
|---|---|---|---|---|
| 6,400,956 | B1 * | 6/2002 | Richton ..................... | 455/456.3 |
| 6,438,385 | B1 * | 8/2002 | Heinonen et al. ............. | 455/501 |
| 6,628,928 | B1 * | 9/2003 | Crosby et al. .................... | 455/77 |
| 6,735,428 | B1 * | 5/2004 | Tsukuda ........................ | 455/296 |
| 2002/0032035 | A1 * | 3/2002 | Teshima ........................ | 455/456 |
| 2003/0143954 | A1 * | 7/2003 | Dettinger et al. ............... | 455/46 |
| 2004/0180670 | A1 * | 9/2004 | Pande et al. ................. | 455/456.1 |
| 2006/0034377 | A1 * | 2/2006 | Chan ............................. | 375/257 |
| 2006/0105784 | A1 * | 5/2006 | Zellner et al. ............. | 455/456.3 |
| 2006/0290348 | A1 * | 12/2006 | Sato ............................. | 324/224 |
| 2007/0063875 | A1 * | 3/2007 | Hoffberg ................... | 340/995.1 |
| 2007/0132578 | A1 * | 6/2007 | Powell ..................... | 340/539.26 |
| 2007/0142021 | A1 * | 6/2007 | Lee et al. .................... | 455/343.1 |
| 2007/0152877 | A1 * | 7/2007 | Madhaven et al. ....... | 342/357.02 |
| 2007/0162858 | A1 * | 7/2007 | Hurley et al. ................. | 715/732 |
| 2008/0059605 | A1 * | 3/2008 | Shalev et al. ................. | 709/217 |
| 2008/0231468 | A1 * | 9/2008 | Myllymaki ............. | 340/870.17 |

FOREIGN PATENT DOCUMENTS

JP         2003023660 A  *  1/2003  ............... H04Q 7/38

OTHER PUBLICATIONS

Chairman Martin and Commissioners Abernathy, Copps, and Adelstein "First Report and Order and Notice of Proposed Rulemaking" Federal Communications Commission, Washington, DC USA, dated May 19, 2005.

* cited by examiner

*Primary Examiner* — Kiet Doan
*Assistant Examiner* — Edward Zhang

(57) ABSTRACT

Methods and systems are provided for venue-based device control and user/position/venue context determinations. Venue corresponds to a geographic region. Venue relevant information is information associated with a venue. A controlled quasi-transient signal comprises a signal, emitted by an entity intrinsic to the venue and not intended to be utilized for operation of the device, coupled with a quasi-transient signal that is coded with the venue relevant information. When a device located in a venue receives a controlled quasi-transient signal, venue-relevant information associated with the venue can be extracted from the controlled quasi-transient signal. Based on the extracted venue relevant information, the device can be controlled in accordance with a control signal generated based on the venue relevant information.

40 Claims, 10 Drawing Sheets

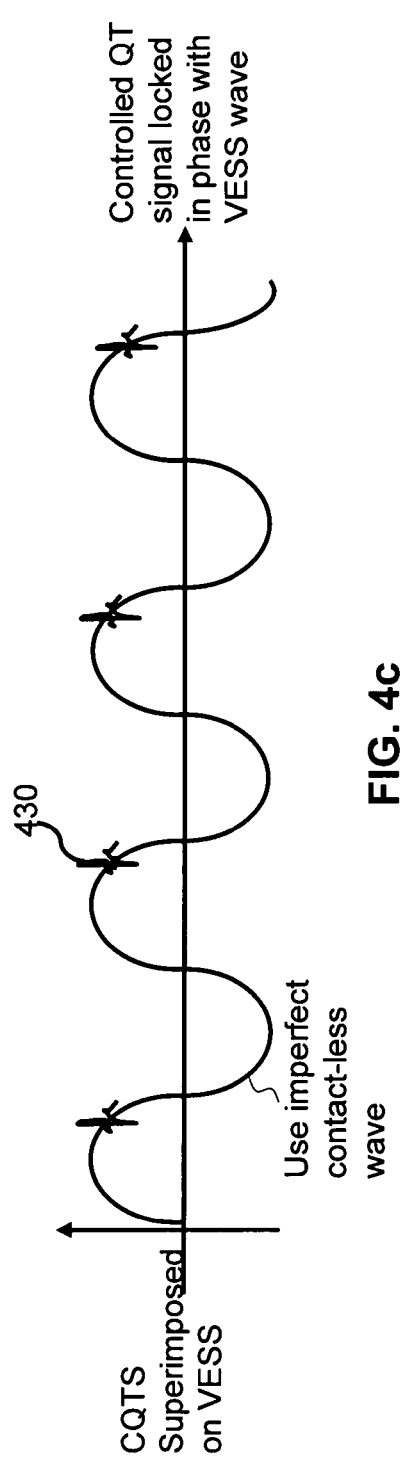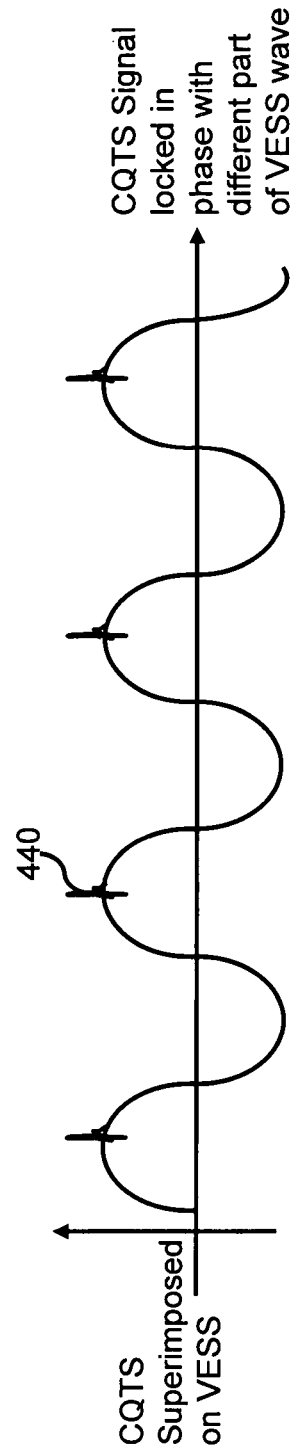
FIG. 4c
FIG. 4d

VENUE-BASED DEVICE CONTROL AND DETERMINATION

BACKGROUND

1. Field of Invention

The teachings presented herein relate to methods and systems for device control and determination thereof. More specifically, this invention provides methods and systems for venue-based position and context determination and control of mobile electronic devices, wireless communication devices, and applications incorporating the same.

2. Discussion of Related Art

The rapid growth and improved capabilities in the fields of telecommunications and electronic devices has led to the needs of geographic location- and position-based device control. Although conventional approaches such as Global Positioning System (GPS) technologies are able to provide device locations, the level of granularity is often not adequate for emerging applications where either a semantically meaningful description of the location is desired (e.g., a postal address) or a more precise localization of the device location is needed (e.g., a room number on a particular floor of a specific building, or on which side of an entryway the device user is situated). Radio-determination technologies of the prior art, while having capabilities adequate for their many applications in navigation and location-finding, cannot provide the degree of localization for the position information necessary for instant control of a device with respect to a user's location and continuously coordinated with the context of venue-related events. In addition, although the coordinate-based location supplied by GPS and radio-determination calculations in the prior art can be converted into semantic addresses through the use of tables and associated mapping software, the results of prior-art technologies usually imply a range of statistically possible locations, not the instantly determinate room or position knowledge necessary for practical, context-compliant control of a device.

Typically, the user contracts for wireless service with a provider licensed to engage in Commercial Mobile Radio Services (CMRS) or information services by the Federal Communications Commission (FCC). For example, a licensed provider programs the user's device to select its wide area network (WAN) signals, i.e. the radio coverage provided by its own cellular radio network or that of a roaming affiliate. Only the user and the wireless network provider to which it subscribes (and roaming affiliates or others under contract) can control aspects of a customer's device such as allowing or denying the use of contracted services. Venue operators, however, have had no such control capabilities over others' personal electronic devices and those used by the telecommunications customers of others.

Licensed cellular radio, Personal Communications Services (PCS) and other types of wide area networks have large coverage from each radio cell or base station node and do not have address-specific (i.e. adequately address-selective) coverage for precise venue estimation without a location system. Microcells, picocells, femtocells, and their small, smaller and smallest radio base stations, respectively, having reduced-coverage radio footprints, can be used to cover subsets of possible locations, thereby narrowing the stochastic address ranges covered as compared to macrocell (larger cell) wide-area radio coverage. However, while cell-size-limited radio coverage is suitable for network selection and the provision of local radio access, it does not provide the venue-specific and in some cases room-specific or even more precise localization that is necessary for useful control of device functions.

Unlicensed wireless systems, such as home- or other venue-based nodes, generally have smaller coverage zones compared even to the smallest of licensed cells (although directional or point-to-point unlicensed systems can exhibit greater range). If equipped to do so, a wireless user's device can attempt to use the radio signals from a venue-based, local node—e.g. an Institute of Electrical and Electronics Engineers, Inc. (IEEE) 802.11 standard-based or other unlicensed node—and can determine whether the local wireless node is near enough for radio communication, thereby enabling selection of that radio modem or local area network (LAN) by the user's wireless device. Traditionally, venue operators within range can grant or deny access to use their wireless coverage and available services, and can typically infer that a user attempting radio access is within a few hundred feet of the venue's base station, but the venue operator does not have the ability to command the behaviors and features (i.e. the applications and the means being taught herein) of telecommunications devices and other personal electronics brought by others that happen to be used at or near the venue. Such device users may not even have the ability to access the venue's radio coverage. Typically, users' personal devices such as wireless phones may not even be equipped for the radio access method or frequency band that may be used by the venue. Further, a user's personal electronics such as stand-alone digital cameras and camcorders may have no wireless capability.

Approaches by others to silence mobile phones by purposefully applying radio-frequency (RF) shielding materials to a room, such as by applying metallic wall and window coverings, or by using illegal RF-jamming methods to prevent the reception of wireless signals at a venue, are improper for general use because they can prevent wireless communications for users within a given venue when there is an urgent need for such communication, e.g., during an emergency. In addition, there may be potential negative consequences for wireless users and the public.

The need to practice venue-based determination and venue-controlled network selection also arises when radio coverage from multiple WANs, and/or LANs, and/or metropolitan area networks (MANs) is simultaneously available to users' devices that can use any or all of the alternative networks. The need to also practice venue-based control of other device features may increase with the growing proliferation of Internet Protocol (IP) enabled devices including voice-over-Internet-Protocol (VoIP) telephones and devices that can access to multiple licensed and unlicensed wireless networks including voice over wireless local area networks (VoWLANs). The use of computer-based telephony, Internet, and VoIP in homes and in other private and public venues will also give rise to such need. Emerging licensed and unlicensed MANs, e.g. those wirelessly serving towns and city-sized areas, will also need these determination and control technologies. MAN operators can also deploy the network-selection-control methods possibly on a scale larger than a single venue. Existing venue-intrinsic and even neighborhood-intrinsic infrastructures can be used for control of users' devices using the techniques presented herein, in order to establish control hierarchies separate from (and not anticipated by) serving-radio-node-based and programmed methods and standards.

In the United States, VoIP networks have recently come under corrective scrutiny by the FCC because many of them had no reliable way to provide location and routing information for use in handling emergency calls. On May 19, 2005, in its *First Report and Order and Notice of Proposed Rulemaking* regarding Enhanced 911 (E911) requirements for IPenabled service providers, the FCC required prompt action by VoIP providers to inform all customers of the limitations of VoIP service and to manually obtain a "registered location" declaration from each VoIP user. Further, VoIP providers were given new requirements for interconnecting with established E911 networks that provide information to government/public safety authorities that respond to emergency calls.

However, venue-based VoIP has portable and nomadic aspects because many customers can use their VoIP devices not only at their own registered location, but also by accessing suitable broadband access points, such as those used by VoWLAN "hot spots," including unlicensed nodes at other locations nationally and globally. Manual registration is an error-prone way to locate any users, but it is obviously untenable for nomadic VoIP. Thus, nomadic mobility can render a VoIP user's registered location instantly incorrect or obsolete. In its Notice, the FCC openly searched for ideas and technological solutions to the "mobile" VoIP location problem. Specifically, the FCC indicated that a number of possible methods have been proposed to automatically identify the location of a VoIP user, including gathering location information through the use of: an access jack inventory; a wireless access point inventory; access point mapping and triangulation; HDTV or high definition television signal triangulation; and various GPS-based solutions.

SUMMARY OF THE INVENTION

In order to effectuate venue-initiated determination, device controls and the desired context-based actions as illustrated herein: (1) a semantically meaningful description of the user's location at a venue is achieved, e.g., a determinate address, such as a postal address is imparted instead of location estimates and ranges subject to stochastic uncertainty; and/or (2) precise localization of the instantaneous position of the user or device is achieved, such as a room number on a particular floor of a specific building; and/or (3) it is continuously made known where the user is positioned at a venue, such as inside or outside, or on which side of a particular doorway, or where positioned in relation to another space or object, including both fixed and mobile users, venues and objects.

For the applications presented herein, precise localization is essential in order to properly and timely (e.g. in real time) control a mobile device (also known as a portable or personal device) according to its position at a venue (also known as a locale) and in accordance with the context-related desires of the user, venue operator and network provider (if any). This need will be explained through application examples, such as one in which a wireless phone is controlled so as not to ring, and instead is commanded by a venue to use a "silent" mode and to forward calls to voice mail when its user is present at a particular place at a certain time. This application could be used in a house of worship during a sermon or service, for example, where and when audible ringing of a user's device would be inappropriate and a breach of proper etiquette. However, as also taught herein, audible ringing can be allowed by the venue's control system when the user is outside of the room where the sermon is ongoing (for example when the user is in an adjacent room, hallway or parking lot, etc.) Additional embodiments (herein) can also allow the venue-controlled phone to audibly ring anywhere at the venue subject also to time-related contexts—e.g. ringing could be allowed before a venue-conducted event begins and instantly upon the event's conclusion. Venue-based controls upon a user's device would also be suspended—and the device would return to its normal modes—upon the user's departure from the venue. This aspect could be appreciated by some users of manual device controls, e.g. those who often forget to turn-on or restore their phone to its normal audible ringing mode after manually silencing it at an event.

There are other dimensions of venue-based control invented herein that are applied to different individuals in ways specific to and modified for each user's personal device (and each network and venue according to agreements, options, preferences, policies and regulations) based on additional criteria. This will be explained in examples that follow, such as different permitted device behaviors for students as compared to teachers, staff and visitors, etc., in schools and classrooms. Device control treatments (e.g. for ringing, alternative network access, messaging, the use of various features such a digital photography, music, video, and recording, etc.) can be simultaneously tailored to each person at the venue, and to school activity time-schedules, events, policies, and even to the nature of a call, although the individual device users subject to the person-specific, venue-based controls may be present at (and moving about in and around) the same school venue, classrooms and common areas.

An aspect introduced herein is the concept that a venue operator (such as for a theater, restaurant, school, office, store, transportation carrier, etc.) can exercise these newly invented controls with respect to each user's own personal device while the user is at or in the venue, although the user and device may not be affiliated in any prior, device-related way with the venue, and the user may not have any telecommunications-customer type of relationship with the venue. Venue-issued position information or commands specific to a building, room, or other determinate position on a property or in a transporting vehicle, said information and/or commands being coupled to a user's device instantly or in a timely manner, is taught herein to be "control qualified" information—essential for context-compliant device control and related policies. In the case of a mobile wireless device controlled by the venue-based methods invented herein, the venue-related information and controls imparted to a user's device need not be contingent upon any subscribed wireless network or actual radio coverage serving the device or location, or to programmed network-selection methods and standards (although these methods can additionally be used). Instead, the control commands described herein are directed by the venue operator to the extent allowed by each user, subject to suitably strong privacy and security provisions that should be implemented by each venue, network provider (if any) and device user, and in accordance with applicable laws.

The venue related device control and determination systems and methods taught herein can be applied to different types of electronic devices, need not be radio coverage based, need not rely on radio base stations or cells, and the device controls are not limited to network selections and the available services of a wireless provider. Instead, the new address-related services, policies, and position-based device controls are made practical from venues and many existing local sources by using nearby, spatially distributed infrastructures, utilities and equipment to which wireless and Internet users routinely find themselves in close proximity. The infrastructures include, for example, conductors for power distribution, electrical branch circuits, cords, light fixtures, telephone and digital subscriber line (DSL) conductors, LAN wiring, computer-related hardware, fiber to the premises (FTTP) equipment, cable television systems, audio equipment, speakers, capacitive-sense switches/displays/touch-pads, utility account metering, grounding, and appliances using electricity, water, natural gas, etc. The "quasi-transient" systems, sources, electrode apparatus and applications as described herein include methods for detecting and supplementing existing, routinely distributed phenomena and signals emitted by an entity intrinsic to the venue, even without the intent that the intrinsically distributed signal is used for the operation of the mobile device. This is done in order to facilitate the coupling and detection of venue and position information and the control commands from a venue's infrastructure to a user's device. These inventions impart information-bearing signals or charges, i.e. the controlled quasi-transients, into the existing venue-intrinsic entities that act as distribution systems, and thereby couple both the existing intrinsic signals and the created controlled signals into fixed and portable electronic devices, wired and wireless, for use in position determination and venue-based control of the devices.

As also taught herein, device control can be exercised by a party independent of any traditional service provider's or venue's radio coverage, and separately from any traditional network selection programming of a device, and without using service-enabling standards. For example, in addition to venue operators, a metered utility provider serving a venue (even one with no radio base station coverage) could use these teachings to have the technical means to exercise control over user devices, and/or to impart venue information, as taught herein, and could become enabled to administer determination and control, for example by using existing utility customer account numbers being associated with the served venue's actual exact physical address (but protected for privacy and security such as by using suitably strong, continuously variable encryption techniques). Further, given the address of a user and the venue-intrinsic coupling to a user's device and the detection means taught herein, a party could implement device controls at a venue via the Internet or other network or communication link to the venue's operator or to the venue-intrinsic infrastructure being used as the means to distribute venue-based control. Example control functions include wireless phone behaviors such a silent mode, available ancillary features such as video recording, and venue-directed network selections such as networks offering additional or alternative services, content, incentives, etc.

As further examples, unintentional radiation of radio signals (e.g. unintended or incidental wireless propagation) and/or other electric, magnetic or electromagnetic fields that emanate from the electrical conductors and equipment used in Power Line Communications (PLC), Broadband over Power Line (BPL), HomePlug® Powerline Alliance technology, and carrier current systems (or the like), radio-frequency identification (RFID) sources, or from conductors and equipment used in telephony (such as in DSL), or networking hardware (such as Ethernet cables) can be used as taught herein to impart position information to devices and serve as a source of control commands for venue- or utility-based control of users' wireless and other devices. The sources of such information and command signals could be at the venue, or (in addition or instead) as in the electric utility examples using PLC or BPL, can be conducted over wires from utility sources not on the venue's premises but directed at devices present at the venue. In addition, by using utility-based electric-distribution infrastructure, a utility operator could control users' devices and direct which radio access networks that a user's device is commanded to select while at a venue. It could also exercise control of devices present within a group of venues, and/or between venues, and/or throughout the neighborhood or town served by the utility's distributed outside plant wiring infrastructure, e.g. coincident with a MAN's served community or its market of interest, even if not all served by the MAN's own radio coverage, and even in the absence of any radio coverage.

Venue related, position-determinative, and networked (e.g. Internet) interfaces can be used to establish new device control hierarchies and can override radio-node-based network selection methods. While said controls can be limited to a specific place, time or purpose, the effects on device behaviors can also be made comprehensive and permanent, for example, by venue operators or other parties offering place-based controls and network access to incentives, content, transactions, features and services for possible acceptance by users. Further, controls can extend to devices and features not related to communications or network selection. For example, as explained herein, a theater operator could control a user's digital camera to prevent the use of flash photography or any type of recording in front of the stage at certain times during a theatrical performance. Similarly, with permission, the theater could control one or more selected features in users' devices that combine multiple functions in a single unit, such as in combination camera-phones or audio/video recording equipment typically present within personal devices, wireless or not, used by those in an audience.

These inventions also have applications in locating users of VoIP, or LANs, or MANs in emergencies. A need for this invention arises from the use of VoIP in any of its wired and wireless forms including wired or cabled broadband access, telephony via computer devices, voice over Wi-Fi® (wireless fidelity), WiMAX® (worldwide interoperability for microwave access) and other growing and emerging networks, including the above-cited technologies (all trademarks being the properties of their respective owners), e.g. based on versions of IEEE Standards 802.11 and 802.16, respectively.

Because controlled quasi-transients can use the semantic address and/or other determinate information from the venue-location from which a call (or message, or data session, etc.) is placed, and the controlled quasi-transients provide additional position information, the methods invented herein are determinative and can have greater precision than other approaches. The use of controlled quasi-transients is as administratively practical as any of the unlicensed location-technology ideas that others have expressed, with the exceptions of existing licensed radio based methods such as GPS and Assisted-GPS (A-GPS), which are already being suitably and beneficially used for E911 by the licensed wireless industry and public safety authorities.

The disclosed systems can also provide location information to local authorities for use in "reverse-911" alerting systems by determining which device users are actually present within a defined geographic boundary impacted by an emergency event or condition requiring notice or instructions to said users. Further, because the systems described herein use time-stamped memory, these systems can use recently stored visited-venue information to determine which users routinely visit or return to a given place (for example, the town in which they live, or the school attended by their children) and that these users may require reverse-911 notification of emergency events in their hometown or near their child's school even if the user happens to be out of town in a particular instance. This reverse-911 aspect and the solution provided herein are also useful in nomadic VoIP because a user's area code and telephone exchange prefix number (e.g. the first six digits of the user's telephone number, typically referred to as the NPA-NXX in the North American Numbering Plan) may not be indicative of their actual location or home community.

Reverse-911 notifications for a town, for example, can be associated with specific users evidencing a need to know of the local alert because they: (1) are known to be in the town based on venue relevant information (VRI) imparted to the user's device at that instant; or (2) are known to routinely return to the town based on stored VRI from recently visited venues as imparted to a user's mobile device. For example, regardless of their present location, the mobile user can be notified by authorities of the existence of an urgent recorded reverse-911 message from (or affecting) the user's hometown location. In preferred embodiments, the user's stored visited-venue information would be securely encrypted, e.g. to be meaningful only to authorities for use in emergency-related situations. Notification could be via automated official voice or text message from the authorities, delivered anywhere through wireless means and/or by using the Internet, a VoIP network, other message-imparting means such as short messaging systems (SMS), by imparting VRI to a user's device at a venue at which the user is present, or by using the public switched telephone network (PSTN) to call the mobile user. An important aspect of this invention is that a user's device that is initially powered off or silenced can be commanded by the venue to be turned on and made operational in order to receive and indicate, such as by audible means, the presence of emergency messages or venue-based alerts.

Position-location methods using the quasi-transient systems described herein are suited for use within buildings and structures because they use venue-intrinsic entities for distribution. The systems can be used alone or in combination with GPS, A-GPS, and/or small-coverage node (e.g. Wi-Fi®) based location systems, for example, to supplement those older location technologies. The systems described herein can work with emergency location systems, wired and wireless, for VoIP, computer-based telephony and data communications, and with circuit-switched systems, and across all disparate methods and networks. In a residence, for example, the technology disclosed herein can allow the user to supplement existing location systems (such as those from a present wireless service provider or VoIP arrangement) by installing these address-determinate inventions for greater family security at home (i.e. for exact address reporting during emergency calls). In some embodiments, said address would be suitably encrypted to be meaningful to authorities responding to an emergency. The systems disclosed herein can also interoperate with safety systems and alarms within and around a structure (combined with suitable privacy and security measures) to provide venue-specific information useful or informative to responding authorities or to the user. Further, these inventions may be made independent of access method (wired or wireless), independent of wireless provider and air interface technology (code division multiple access or CDMA, Global System for Mobile or GSM, ultrawideband or UWB, Orthogonal Frequency Division Multiplexing or OFDM, Wi-Fi®, analog, etc.), independent of the frequency bands used for wireless, and can be independent of (or work in conjunction with) any location system presently in use. Thus, the need for the inventions herein extends not only to handsets, but also to products for homes, buildings, and in transportation. The need is particularly acute where nomadic VoIP devices are used on a wired or unlicensed wireless node. These needs are likely to increase nationwide as more homes and businesses use VoIP or data communication in any form, and/or predominately use wireless communication when at a venue.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 4a-4d illustrate exemplary venue existing signal sources (VESSs), according to an embodiment of the present teaching;

DETAILED DESCRIPTION OF EXEMPLARY EMBODIMENTS

Figure 1:
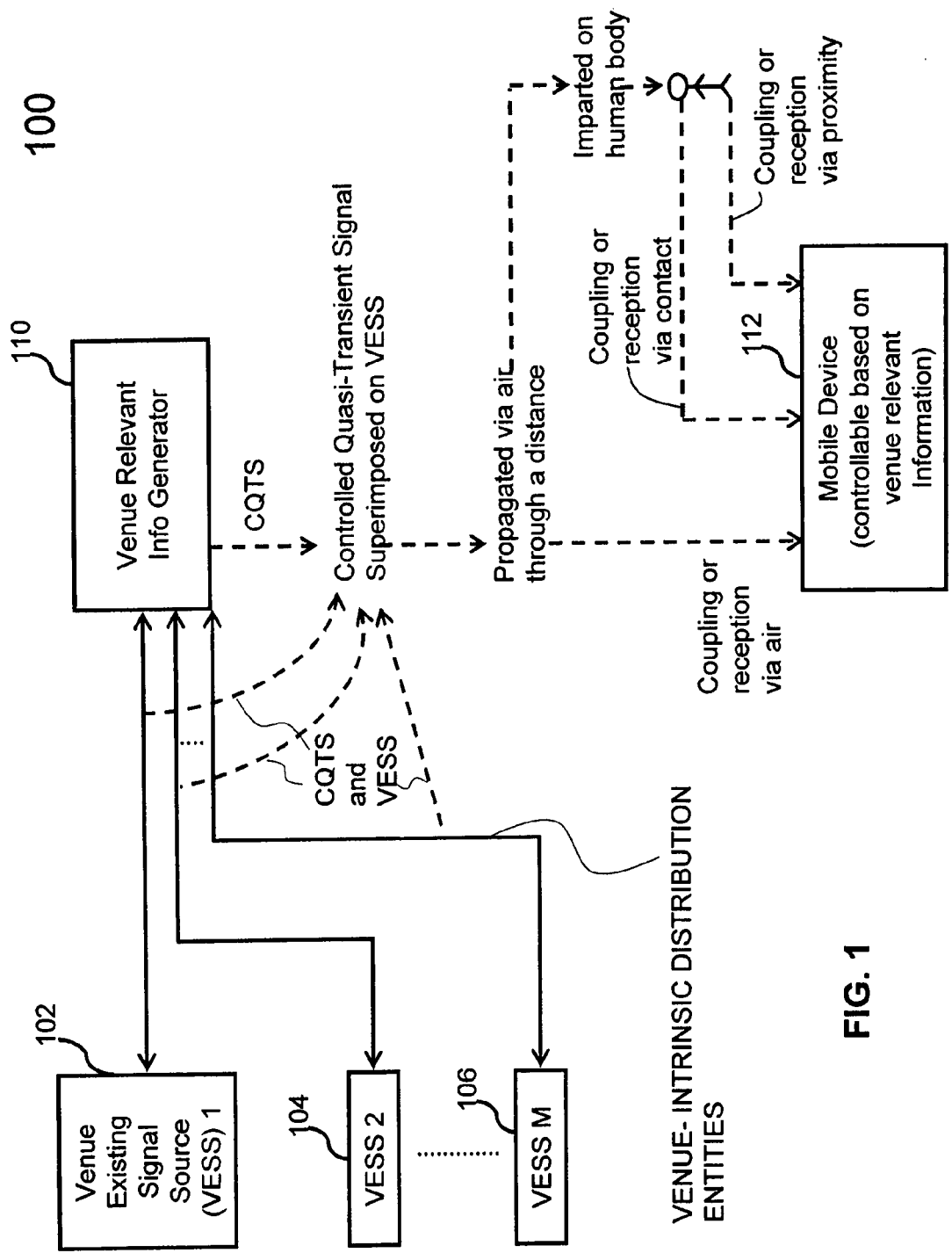
FIG. 1 depicts an exemplary framework in which a mobile device is controllable based on venue relevant information (VRI) extracted from controlled quasi-transient signals (CQTS) transmitted or coupled via a low-average-power signal or charge distributed and propagated through venue-intrinsic entities and in air or through a distance, according to an embodiment of the present teaching.

FIG. 1 depicts an exemplary framework 100 in which a mobile device 112 is controllable based on venue relevant information (VRI) extracted from controlled quasi-transient signal(s) transmitted or coupled via a low-average-power signal or charge that may be distributed via venue-intrinsic entities and propagated in the air or through a distance, according to an embodiment of the present teaching. The framework 100 comprises one or more venue existing signal sources (VESS) 102, 104, . . . , 106, a venue relevant information generator 110, which generates and codes venue relevant information and then couples the coded venue relevant information to at least one venue-intrinsic entity such as an electrical branch circuit that inherently exhibits electric, magnetic or electromagnetic fields that are the VESSs to which the controlled quasi-transient signals (CQTS) may be referenced, e.g. in time or phase. The CQTS are distributed at the venue generally along the same existing paths with selected VESSs, and propagated via the air or through a distance for coupling to the mobile device 112 that is controllable based on the venue relevant information. In an additional embodiment described herein, CQTS are acoustically propagated.

A "fixed" venue is defined herein as a geographic location or position, identifiable based on a semantic address and/or other precisely determinate description. For example, a residential home or a business building corresponds to a venue that is identifiable based on a postal address. Such a venue needs to be distinguishable from (and not grouped with) others. Location estimates and stochastic treatments can obscure an individual address among multiple venue addresses at the same building location. There can be multiple dwelling units or other venues in a building or complex, each of which is distinct, and each one can be identified by a distinct postal address by the methods disclosed herein. In addition, each floor or even each room on each floor of a building, or another precisely identified position, may represent a distinct venue that is distinguishable by the methods taught herein.

A "transportation" venue can be any means of transport, including a vehicle such as an automobile, train, plane or boat. Both fixed and transportation venues are included in the precepts and applications taught herein. In transportation venues such as train-cars, although having no postal addresses, said transportation venues can have other identifiers and can contactlessly impart their VRI via train-car specific CQTS to devices used by passengers within the train-cars. The CQTS can contain whatever VRI is known (by any means obtained) by the transportation venue operator (i.e. the train's conductor or operator) such as through the use of programmed semantic position descriptions and other information inputs, e.g. railroad mile-marker numbers, etc. For example, the CQTS can be used to impart VRI containing the train number, a specific car identifier, the station-stop name (if at a stop), or how far and in which direction the train is with reference to given station stop. In a control application, e.g. in a "quiet car" in which the transportation venue operator does not allow phone ringing and phone conversations, the CQTS and VRI could be used to invoke "silent mode" in order to prevent ringing by users' devices within that specific train car, even while the train and/or device user are moving. Similarly, on board an aircraft, the transportation venue's (i.e. a plane's) CQTS and VRI could be imparted under the control of the transportation venue operator (e.g. the plane's captain or pilot) to passengers' devices and used to control which wireless networks can be accessed during flight, or could power-off any or all of users' electronic devices at certain times (e.g. for take-offs and landings). This type of device control could be made effective even if an electronic device was packed in luggage or otherwise separated from its user. In addition, during any emergency call, the transportation venue's position and other VRI in the transportation venue's CQTS, coupled to a user's device as taught herein, could automatically be sent to the authorities being summoned for help by anyone using the device to make the call. Further, the device's time-stamped memory of the location-bearing VRI could be accessed by authorities during or after the call in response to the caller's request for assistance. (All example applications are subject to implementing suitable protective means for ensuring privacy and security. In preferred embodiments, said location-bearing VRI information would be suitably strongly encrypted to be meaningful only to authorities responding to an emergency.)

In an environment with ubiquitous electric power distribution and utility supplies, a venue existing signal source (VESS) exists because the 60 Hertz power lines and branch circuits produce signals, including harmonics, fields and charges that are conducted, distributed and then propagated and emitted, e.g., via electric, magnetic, and electromagnetic near-fields, in the air or through distance. Individuals and devices present in the venue may be electrically imparted with low power remnants or artifacts of such signals, including transients, unintentionally and without contact. The present teaching describes a method and system in which low power signals intrinsic to a venue, and the herein created controlled quasi-transients, are utilized to contactlessly transmit or couple venue relevant information to a device that is in the venue and may additionally be enhanced by the user's mobile device being in proximity to or in contact with the user (e.g., human) who is present at the venue.

In another jointly or separately used embodiment herein, a venue's sound system, such as a public address audio amplifier and loudspeaker or sonic source, are used to acoustically distribute CQTS and VRI, for example in a theater, and to acoustically couple the associated control commands to users' devices for the purposes of venue-based control and determination.

Transients may be defined as random and/or repetitive events that are unplanned and unintended in their nature. Transients are generally not under any type of control. For example, electrical power contains unintended voltages, currents and variations in addition to desired sine wave alternating current (AC) power. These disturbances are transients. They may be caused by electrical switching, sparks, arcs, discharges, faults, lightening, or by conducted, radiated, or otherwise coupled interferences among different pieces of electrical and electronic equipment. It is revealed by the present teaching that minuscule AC voltages and currents are contactlessly and unintentionally coupled to individuals and devices, and to devices wherein said minuscule voltages and currents are coupled via an individual, due to device and human contact or proximity. Most local transients within some ranges of frequency are contactlessly coupled as well. Certain minuscule transients can be detected, when contactlessly coupled through virtual filtering as explained below. Understanding such phenomena can be utilized according to teachings described herein to practice certain non-acoustic embodiments of these inventions.

Simple experiments conducted herein by a person skilled in the art, using a Hickok oscilloscope (having high input impedance), revealed that capacitive coupling is one mode of contactless coupling of existing venue-intrinsic electrical signals, charges and transients to nearby individuals and devices (and to devices wherein said signals are coupled via an individual, due to device and human contact or proximity). For example, a device or body can comprise one virtual "plate" of an air-dielectric (although unintended) capacitor. The value of the virtual capacitor can be modeled as functions of the conductive surface areas of devices, individuals (separately, and/or jointly if there is contact or proximity) and electrical systems, their relative orientations, the distances (e.g. in air) between them, and the effects of other stray capacitances through air and distances to ground-paths. The capacitive reactance, $X_C$, is known to be a function of $1/2\pi f C$, where f=frequency and C=virtual capacitance.

Observations described herein of the contactlessly coupled minuscule voltages and currents on devices and/or individuals arising from a venue's VESS and/or CQTS emanations through air distances (and coupling to mobile devices wherein said minuscule VESS and/or CQTS voltages and currents are coupled via an individual, due to mobile device and human contact or proximity) revealed the presence of the naturally filtered and severely attenuated 60-Hertz waveform from nearby power wiring, equipment and electrical cords, distorted by the power source's higher-frequency harmonic components emphasized by virtue of the capacitive coupling mode. It was also noted that the minuscule voltages, currents, charges and displacement effects that are contactlessly and unintentionally coupled to individuals and devices through air or distance (and to devices wherein said minuscule effects are coupled via an individual, due to device and human contact or proximity) also contain the effects of most local VESS including transients. For contactless capacitive coupling of certain VESS with fast rise- or fall-times such as some transient pulses, the transients are actually better contactlessly coupled to individuals and devices (and to devices wherein said transients are coupled via an individual, due to device and human contact or proximity) than is the fundamental 60-Hertz signal. The contactless "transient coupling gain" of transients and higher-frequency harmonics through air or distance is the lower loss that can be partly explained in terms of lower $X_C$ at higher frequencies as implied by $1/2\pi fC$. The components of a transient pulse are often compound, being functions of its rise-time, uncontrolled intermediate bursty variations and damping characteristics. As a result, certain minuscule voltage transients and charges become more easily detected when contactlessly coupled through this type of virtual filtering. Further, attenuated magnetic-field transient effects can be modeled based on inductive reactance, $X_L$, which is a function of $2\pi fL$, where f=frequency and L=virtual inductance. This is also used jointly and separately in other device and individual contactless coupling embodiments (to impart VESS and CQTS) as invented and described herein.

Since uncontrolled, undesired transient signals, although weak, are already naturally and contactlessly coupled from existing venue-intrinsic infrastructures to nearby individuals and devices (and to devices wherein said transient signals are coupled via an individual, e.g. due to mobile device and human contact or proximity), and that transients maintain their timing relationships relative to the weak remnants of the 60-Hertz waveform and its harmonics that are also contactlessly coupled, said relationships being useful for detection using electronic means, the above discoveries are used herein. Transients have generally been considered to be undesired interference and noise-like, and thus in need of suppression and elimination. However, the teachings described herein make use of the contactless coupling qualities of transients and transient-like pulses at a venue, and the fact that pulses with transient-like qualities are locally distributed by existing venue-intrinsic means and can be confined to specific positions in and around a venue. The practice of these teachings is for interpretation by persons skilled in electrical safety. The voltage and current in an electrical power line, cord or equipment connected thereto is dangerous and lethal and must not be in contact with a user. Electrical safety standards, practices and building codes such as those established by expert organizations and governing authorities must be followed at all times.

The present teaching describes the utilization of contactless, controlled quasi-transients and associated phenomena for control and determination of users' devices. Controlled quasi-transients, unlike transients, are under control and can be purposely deployed and distributed to have their presence limited to a venue or to certain positions at a venue, and can be modulated and coded with intended information. Quasi-transients may be controlled and modulated in terms of frequency, phase, timing, amplitude (strength), waveform/wave-shape, repetition rate, duration, rise- and fall-time, coding, etc. The relationship of a controlled quasi-transient within the cycle of a 60 Hertz AC wave used for electrical power (and specifically with reference to the timing of the zero crossing points on the AC wave) can also be controlled, for example by phase-locking techniques, to aid in detecting a very weak CQTS or charges such as may occur near or below the noise level. Detection is facilitated by knowing, in advance, the timing of CQTS occurrences in relation to defined points on the AC waveform. Such parameters and the peak power level of the CQTS may be adjusted to achieve the desired contactless coupling and/or the detection of the modulated or coded information in wireless and other devices.

In the event of venue-intrinsic, repetitive, interfering transients at predictable points (e.g. in time or with reference to the AC cycle) or observed at certain frequencies or spectra at a given venue, different timing or spectra can be selected by the VRIG for use herein in order to facilitate CQTS detection by a user's device at that venue. Similarly, to prevent interference to electrical appliances and electronic equipment potentially caused by conducted CQTS on the same branch-circuit, the VRIG used herein can be adjusted to avoid creating interference, i.e. by operating within interference limits as may be specified by manufacturers of venue intrinsic equipment. For example, the CQTS can be phase-locked and made to avoid the zero-crossing points on the AC wave, as may be prudent if the zero-crossings are used by others for sensitive applications such as timing, clock or switching references (as may be practiced in some commonly connected equipment).

A venue existing signal source (VESS) contactlessly emits or can impart a low power signal that is intrinsic to the venue, independent of any signal used by a wireless device for its operation at the venue. That is, such unintended low power signals exist and are distributed at the venue, and they are utilized in the teachings herein. For example, electrical power distribution, as it is commonly used, inherently emits unintended signals. These unintended emitted signals include the fundamental 60-Hertz AC power-line frequency combined with its harmonics and their electric, magnetic and electromagnetic near-fields that may be contactlessly coupled to individuals and devices (and to devices wherein any of said emitted signals are coupled via an individual, e.g. due to mobile device and human contact or proximity), such as by capacitive and/or inductive means. In addition, any equipment-produced noise (or artifacts) or carrier current signals on a power or grounding conductor, and all disturbances that are transient in nature, are also readily available for contactless coupling. Such low power signals are emitted by entities present in each specific venue, and are distributed by entities such as branch circuits and equipment intrinsic to the venue.

Signals from additional VESSs also exist. They include contactless emanations or coupling effects that may be distributed on existing venue-intrinsic infrastructures. These signals and charges are used in device coupling as taught herein. Examples of additional VESSs include radiated waves emitted by a power line due to radio frequency (RF) emissions including those from unintentional radiators (e.g. PLC, BPL, HomePlug® Powerline Alliance technology, carrier current systems, etc.), incidental radiators, e.g. as defined by the FCC, and signals, fields or charges emitted by a telephone or DSL line, cable, wire, computer connection line, LAN conductor, grounding conductor, pipe, conduit, structure, ground path, etc. VESS used herein also include lower frequency non-RF sources and fields such as those from audio signal conductors, T-coil (telecoil) compatible audio sending systems (for example, wire loop systems in theaters as commonly used for the hearing impaired) and loudspeakers, including the use of sound signals and acoustic coupling.

Venue relevant information (VRI) may be defined as information associated with a specific venue. VRI can be a textual description of the underlying venue. For example, a postal address is such a textual description of a building or household venue. Such textual description may also be a specific floor or room number within a building or a household. There are other possible types of fixed- and transportation-venue relevant information. A detailed discussion is provided with reference to FIG. 3.

To utilize a low power VESS and CQTS to contactlessly transmit or couple venue relevant information to a mobile device, the venue relevant information is first coded in the form of one or more burst signals with certain frequencies. The frequencies adopted may be different from a detected VESS and different bursts may be generated by the VRIG at controlled time intervals. Such coded CQTS may not be completely transient because it is modulated with venue relevant information and may repeat in a controlled manner for a period of time or may be cycled through continuously. Such a coded signal is quasi-transient in the sense that signals are emitted as fast rise-time bursts with spectral and power density characteristics similar to uncontrolled transients, but in this case with the purpose of achieving contactless coupling (of the CQTS modulated with VRI) to user devices—preferably such that CQTS distribution at the venue and coupling to user devices be as good or better than that achieved by the VESS, which may in addition be used as a carrier-like reference (e.g. for phase-locking and detection of the CQTS). Depending on the amount of information, each burst may code a portion of or the full venue relevant information and/or commands. When venue relevant information is brief or short, one burst may be adequate to encode all the information. When multiple bursts are used to code venue relevant information, a series of bursts in sequence may together provide the complete venue relevant information. For example, a postal address may be coded using two bursts, one for street address and the other for city/state information. Additional bursts would contain control-command information. In some embodiments, said address may be encrypted to be meaningful as used herein and to those authorized to use it responding to an emergency. While discrete, pulse-like CQTS may be used, CQTS could also be implemented using spread-spectrum modulation and coding such as direct sequence spread spectrum.

To transmit or couple coded venue relevant information, one or more VESSs may be utilized as phase, timing, or other information-detection and demodulation references for the superimposed coded CQTS that bears the venue-relevant information. Discussion related to encoding venue relevant information as a controlled quasi-transient signal and in some instances the superimposition thereof on a VESS are provided with reference to FIG. 4. A signal modulated with coded venue relevant information is a controlled quasi-transient that is propagated via the air or through a distance and may be imparted on a device or human body present in or at the venue. In this manner, venue relevant information is transmitted or coupled, including by capacitive or inductive near-field means, and/or charge coupled, and/or acoustically coupled, via a controlled quasi-transient signal. When the controlled quasi-transient signal or charge imparted on a device or body is detected by the device (said detection being enhanced in some embodiments e.g. through mobile device contact or proximity to the human body), the venue relevant information, modulated on the controlled quasi-transient signal can then be extracted and used for position determination and device control.

The overall operation of the framework 100 is described below. The framework 100 may be applicable with respect to a specific venue. To facilitate the mobile device 112 to perform venue-based position determination and device control, venue relevant information is to be transmitted or coupled to the device by superimposing coded venue relevant information onto one or more venue-intrinsic infrastructures that already distribute VESSs, and propagating the coded venue relevant information via the air or through a distance. To enable such transmission or coupling, the venue relevant information generator 110 is installed in the venue. Based on the locale, the VRIG generates venue specific information and codes such information. To contactlessly transmit or couple such coded venue-specific information to the mobile device 112, the venue relevant information generator is connected to conductive infrastructures existing in the venue that distributes venue existing signal sources 102, 104, . . . 106, and superimposes or modulates the coded venue relevant information onto one or more VESS-carrying infrastructures to distribute the controlled quasi-transient signals, which carry the venue relevant information and are propagated via the air or through a distance.

When such a CQTS and a VESS are propagated in the air or through distance, they may be imparted on a device and/or a human body (and on devices wherein said CQTS and VESS are first contactlessly coupled to an individual and then to a device e.g. due to mobile device and human contact or proximity). For example, when a user of the mobile device 112 is present in the locale where the venue relevant information generator is, the controlled quasi-transient signal coded with venue specific information may be coupled to the user's device and/or body. The mobile device 112 is constructed to have one or more sensors receptive to low-average-power signals, including transients, either when there is a direct contact between the user's mobile device and the user's body, e.g. through the user's hand or ear; or when the mobile device is in proximity to the user's body in a proximity reception mode (e.g., the mobile device 112 is in its user's pocket). In some embodiments, such receptors may be designed to be able to intercept in the air or through distance the low-average-power signals superimposed with coded venue relevant information without the device's contact or proximity to the user's body, or to purposefully alternate or cycle between the available coupling modes in any given venue and instance, and by switching among direct- and through-user capacitive, inductive or other (e.g. lumped inductance within device) modes as described below, to achieve optimal VESS and CQTS coupling to a device through air or distance. Contactless near-field electric, magnetic, electromagnetic and/or acoustic coupling are used in the preferred embodiments.

Upon sensing the venue existing signal source coupled with the controlled quasi-transient signal, the mobile device 112 separates the CQTS coded with venue relevant information from the low power VESS (both as distributed by infrastructure and objects intrinsic to the venue) and decodes the quasi-transient signal to obtain the venue relevant information, which can then be used to determine how the mobile device 112 is to be controlled.

In framework 100, the mobile device 112 can be any electronic device that is portable such as a mobile station. This includes a cordless or wireless phone such as a mobile phone, a walkie-talkie (e.g. a push-to-talk transceiver) a handheld device such as a gaming machine, a computer, a personal digital/data assistant, a camera, a (e.g. music or video) media player/recorder/operator, a medical device, a data storage device, a navigation device, a person- (or object-) finding device, an alerting device, a network (e.g. Internet) access means, a network device, a display device, or a television device. The mobile device 112 may operate in a stand-alone manner. Alternatively, the mobile device 112 may operate in a networked manner by connecting to a network and communicating via the network. Furthermore, a single mobile device may be capable of switching between a stand-alone operational mode and a networked operational mode.

In a stand-alone operational mode, the mobile device 112 may be equipped with a controller that is capable of changing the status of the mobile device 112 based on received venue relevant information. In a specific locale (as shown in FIG. 1), the stand-alone mobile device 112 intercepts low power VESS and CQTS signals, via air or through a distance, or via a human body contactlessly imparted with the low power signals (i.e. VESS and CQTS intercepted on devices wherein said low power signals are first contactlessly coupled via an individual and then to a device, e.g. due to mobile device and human contact or proximity) and derives venue relevant information from the received low power signals. Such venue relevant information, as carried on and detected from the CQTS, is utilized by the controller of the mobile device to determine how to control the mobile device accordingly.

Figure 2A:
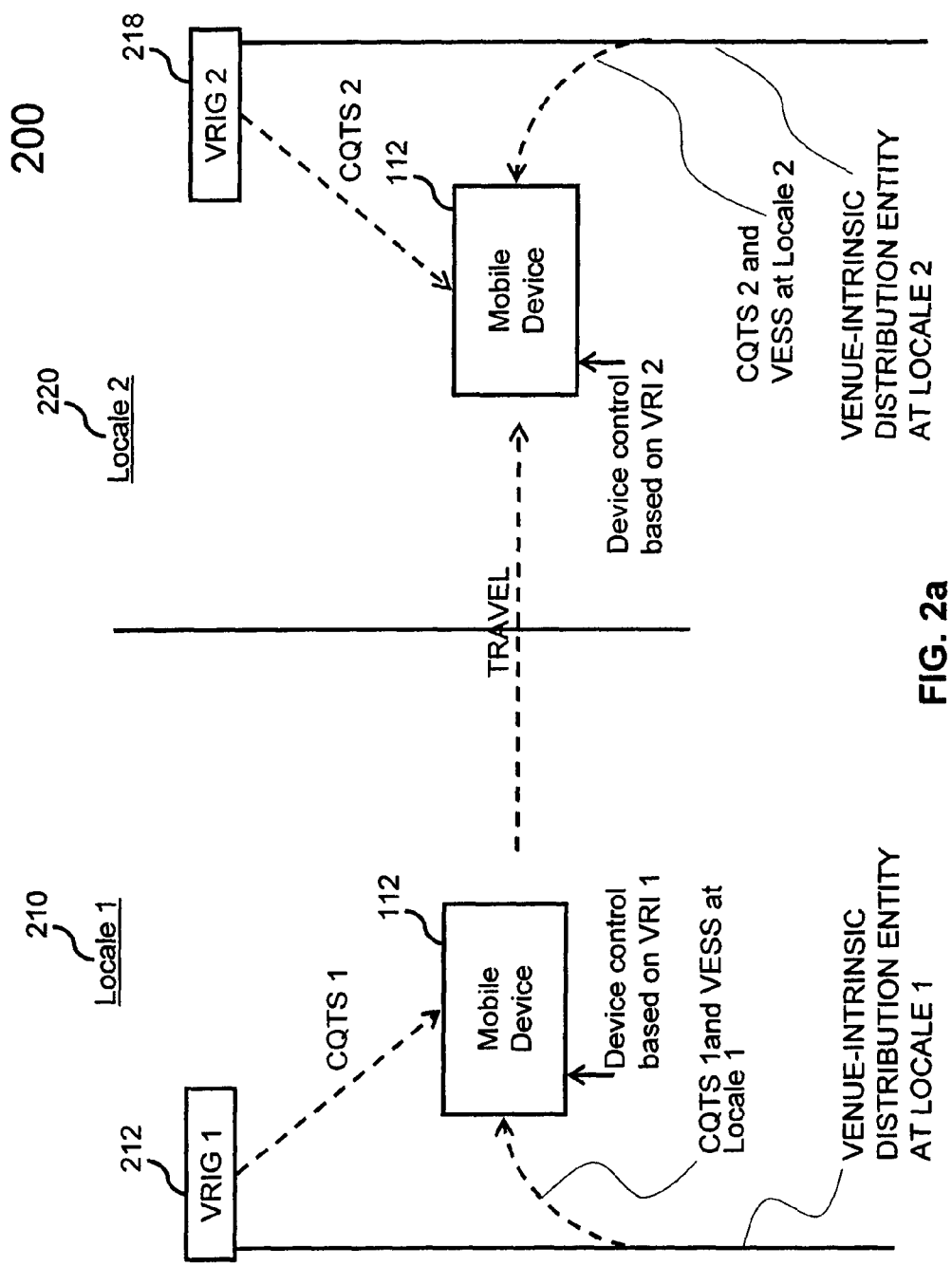
FIG. 2a illustrates an exemplary operational mode in which a mobile device controls its operational states based on venue relevant information extracted from controlled quasi-transient signal(s) transmitted or coupled via a low-average-power signal or charge distributed and propagated through venue-intrinsic entities and in air or through a distance, according to an embodiment of the present teaching.

The mobile device 112 may travel from one locale to another. This is depicted in FIG. 2a, in which the mobile device 112 travels from locale 1 210 to locale 2 220. Each locale may have its own venue relevant information generator. For example, locale 1 210 may have a venue relevant information generator VRIG 1 212 installed therein and locale 2 220 may have another venue relevant information generator VRIG 2 218 installed therein. A venue relevant information generator (VRIG) in each locale may be designed to provide venue information associated with only the locale in which it is installed and each VRIG may impose controlled quasi-transient signal coded with its own venue information to low power signal source(s) found in its own locale. For example, each household may have a VRIG that provides the postal address of the house as venue relevant information. Each room of a school or each building of an office complex, etc., may have its own VRIG or VRIGs that may provide floor location and room number in addition to a postal address as venue relevant information. In preferred embodiments, said address would be encrypted so as to be meaningful only as used herein and to authorities responding to an emergency.

The actual CQTS from the VRIG may be distributed to a position, such as a room, from a place outside the room. For example, an electric, magnetic or electromagnetic near-field VESS and CQTS can be distributed via an electric power branch circuit serving a floor of a building, but the branch circuit and its VESS and CQTS may originate elsewhere. In another example, an acoustic CQTS for a room can emanate from a loudspeaker in the room that is driven by an amplifier or source that may be conveniently located elsewhere.

When a mobile device travels from one locale to another, the mobile device 112 may perform different controls depending on the venue relevant information received within each locale. As depicted in FIG. 2a, when the mobile device 112 is in locale 1, it is controlled based on venue relevant information VRI 1 associated with locale 1. When the mobile device 112 arrives in locale 2, it is controlled based on venue relevant information VRI 2 is associated with locale 2. For instance, if locale 1 210 represents a movie theater and the venue relevant information indicating such is propagated via air or through distance in locale 1, when the mobile device 112 receives, while in locale 1, such information, the mobile device 112, e.g., a mobile phone like device, may control the device to turn off the ringer. If locale 2 220 represents outside of the movie theater, when the mobile device 112 receives, after traveling to locale 2, venue relevant information indicating such, the mobile device 112 may accordingly control the device to turn its ringer back on.

Figure 2B:
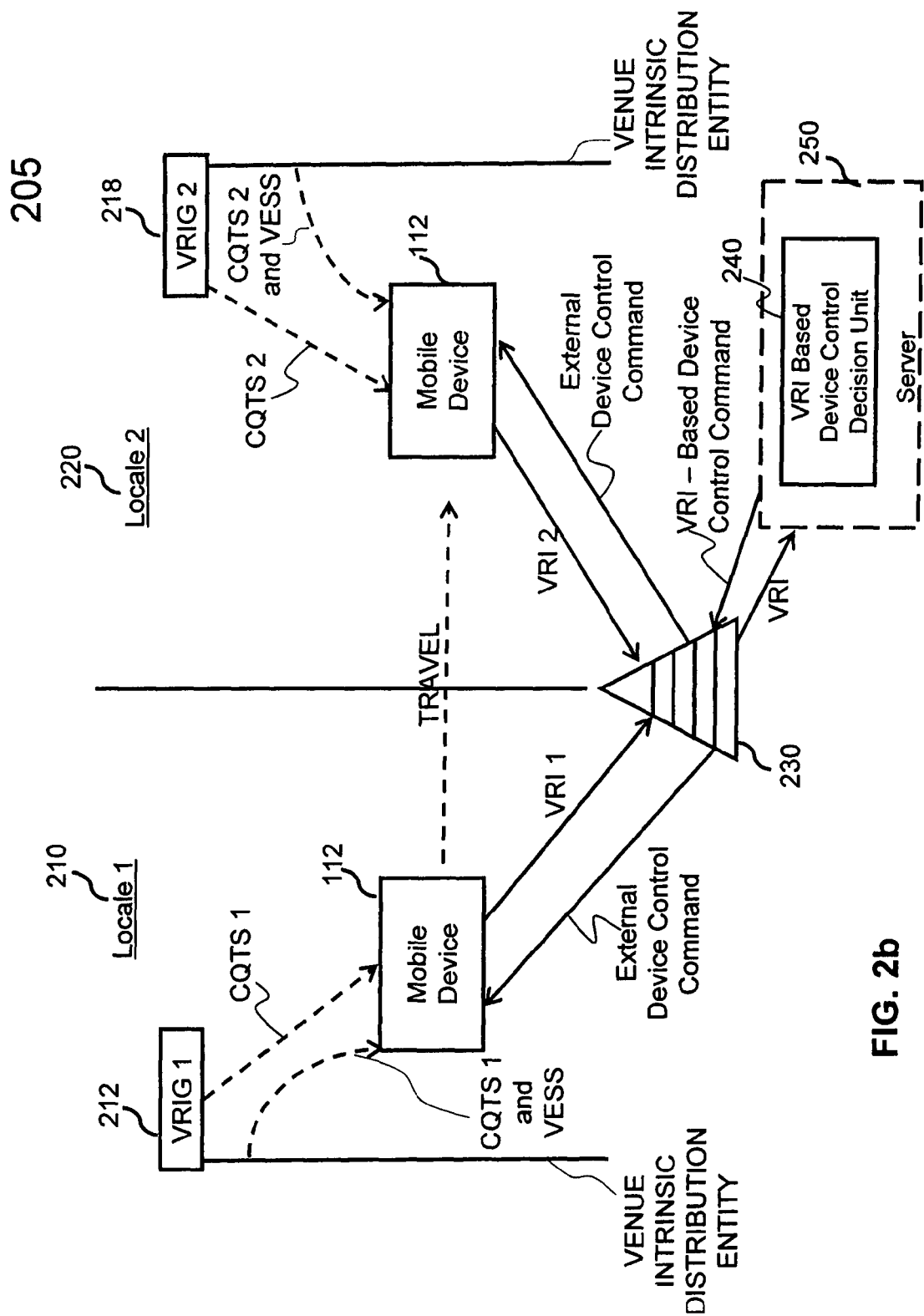
FIG. 2b illustrates an exemplary operational mode in which the states of a mobile device are controlled via a networked connection based on venue relevant information extracted from controlled quasi-transient signal(s) transmitted or coupled via low-average-power signals or charges distributed and propagated through venue-intrinsic entities and in air or through a distance, according to an embodiment of the present teaching.

In a networked operational mode, the mobile device 112 may be constructed with networking capabilities enabling the device to communicate with a controller via a network to control the status of the mobile device 112 based on received venue relevant information. In this operational mode, in each locale, e.g., locale 1 210 as shown in FIG. 2b, a VRIG 1 212 transmits venue relevant information coded as controlled quasi-transient signal 1 (CQTS 1) by coordinating or phase-locking the CQTS 1 with some low power artifact of a signal source(s) existing in locale 1. Such coupled low power signals are transmitted (or coupled from) in the air or through distance and received by (coupled to) the mobile device 112. Upon receiving or coupling CQTS 1, the mobile device 112 may extract venue relevant information associated with locale 1 (VRI 1) and then send the VRI 1 to a server 250 via a network 230. A VRI based device control decision unit 240 in the server 250 may analyze the received venue information VRI 1, determine a specific control to be exercised on the mobile device 112, and then send a corresponding control command to the mobile device 112 via the network 230. Upon receiving the control command via the network, the mobile device 112 executes the control command to carry out device control.

Similar to stand-alone operational mode, when the mobile device 112 travels from locale 1 210 to locale 2 220, the mobile device 112 contactlessly couples to and receives CQTS 2 from VRIG 2 218 installed in locale 2. The CQTS 2 carries venue relevant information associated with locale 2 or VRI 2. When the mobile device 112 extracts VRI 2, it transmits VRI 2 to the server 250 via network 230. The VRI based device control decision unit 240 in the server 250 makes a control decision based on the received venue information VRI 2 and transmits a device control command back to the mobile device 112 via the network 230. When the mobile device 112 receives the device control command from the decision unit 240 via network 230, it carries out the device control by executing the received control command.

In the networked operational mode, the network 230 may correspond to any network, including LAN, MAN, WAN, wired networks, wireless networks, the Internet, a proprietary network, a virtual network, or any combination thereof. The network 230 may also represent a plurality of networks dynamically configured to provide a communication path between the mobile device 230 and the server 250 having the VRI based device control decision unit 240 therein.

The server 250 or the VRI based device control decision unit 240 may be a centralized functional unit or a collective functional unit distributed at different geographic locations. The server 250 or VRI based device control decision unit 240 may be operated by a network service provider. The mobile device 112 may subscribe for services from this service provider. Alternatively, the server 250 or the VRI based device control decision unit 240 may also be operated by a venue operator. Furthermore, the server 250 or the VRI based device control decision unit 240 may be operated by a third party service provider, any other party, or a collective of different parties.

While the mobile device 112 travels from one locale to another, it may connect to (i.e. communicate with) different networks that are appropriate to each locale. In addition, at different locales, the mobile device 112 may connect to (contactlessly couple to) different VRI based device control decision units appropriate to the locales in which the mobile device 112 is located. In some embodiments, the mobile device 112 may operate in stand-alone mode in certain locales and may switch to the networked control mode in other locales. The switching between different modes may depend on the networking capabilities in each locale, the accessibility to any centralized VRI based device control decision unit, the actual venue relevant information and commands, and the user's direct control that in preferred embodiments can override most or all venue-based controls. However, in some venues, networked communication may be prohibited and a venue relevant information generator in such a locale may transmit such prohibition to the mobile device 112 so that the mobile device 112 may switch to a stand-alone venue-control mode.

In some embodiments, there may be a configured control hierarchy. For example, a networked control mode may be set at a higher priority than a device self-control mode. In this case, a default control mode may be the networked control mode. The mobile device 112 may switch to a stand-alone control mode only when there is no access to a network to achieve the networked device control. In some embodiments, the mobile device 112 may be restricted to size and/weight so that it is preferred to have minimum number of components. In this case, a networked operational control mode may be preferred for device control. In other embodiments, to maintain the flexibility of being able to exercise different controls in different venues, it may not be efficiently practical to implement all control capabilities in a single mobile device. For example, a mobile device may travel across multiple jurisdictions, each having different regulations as to how a device should be controlled in public locations/events. In addition, such requirements may change over time. In this case, a central control may be preferred that is equipped with relatively complex control mechanism and can be re-configured in a centralized manner when policies/regulations are updated. Further, in preferred embodiments, the user maintains the highest position in the control hierarchy and can, manually or by programming consistent with contractual agreements with that user's chosen network service provider, override most or all venue-issued control commands or choose to deny or allow a venue-based command in any given instance.

Figure 3:
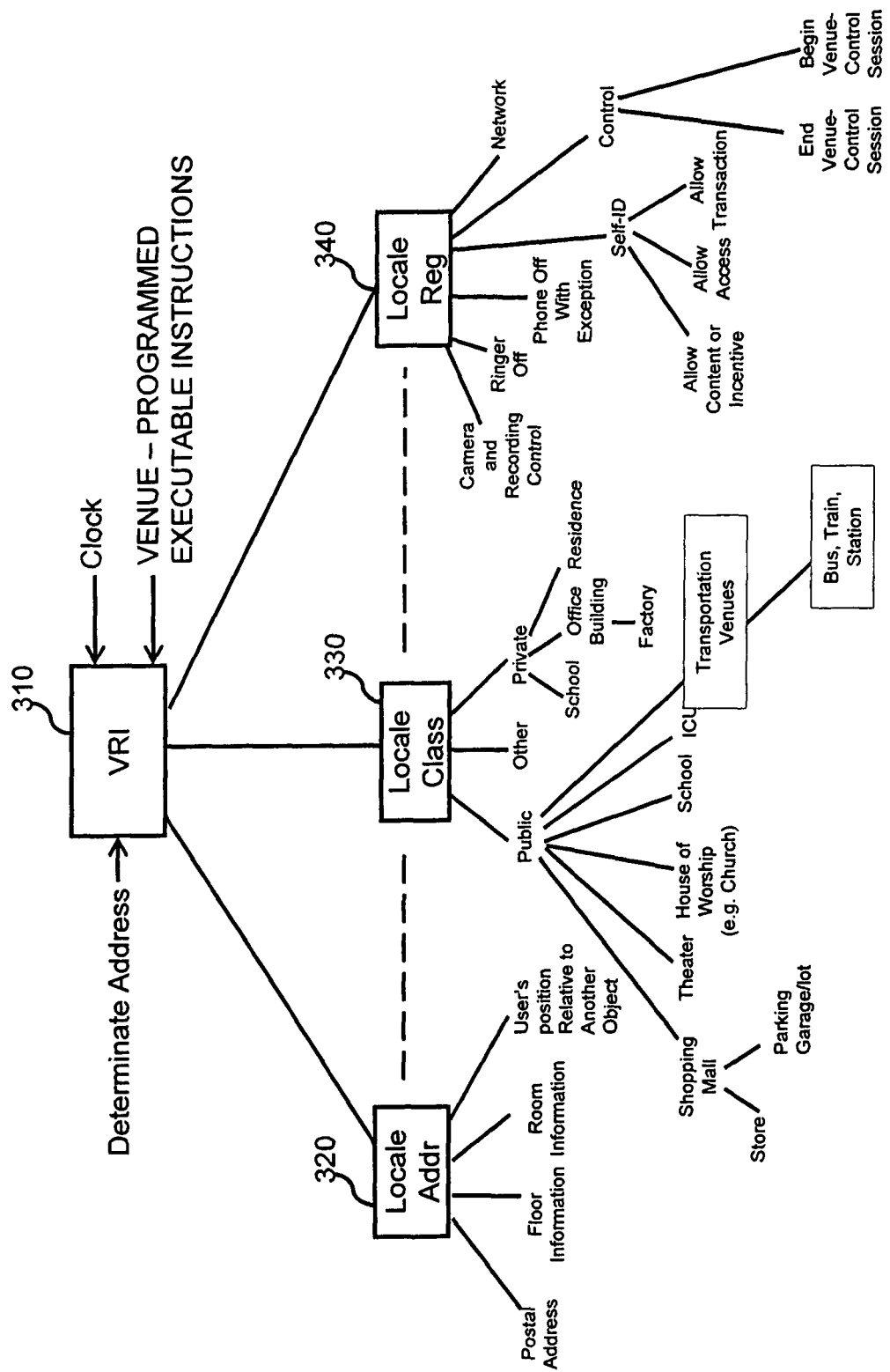
FIG. 3 illustrates exemplary types of venue relevant information according to some embodiments of the present teaching.

A venue relevant information generator may be utilized to convey different types of information that is venue specific. FIG. 3 illustrates exemplary types of venue relevant information according to some embodiments of the present teaching. Venue relevant information 310 may include, but not be limited to, locale address 320, . . . , locale classification 330, . . . , locale control requirement 340, or any combination of such information. Locale address 320 may include information corresponding to different levels of granularity such as a postal address, floor information associated with a building/house, or even room information associated with a specific floor in a building, or the user's position with respect to another nearby object such as a doorway or vehicle. Locale classification 330 may include information that indicates the nature of a locale such as a public location, a private location, or a location that is neither pubic nor private, etc. Further information may be provided as to locale classification. For example, in the category of a public locale, there can be a theater, a house of worship (e.g. a church), a school, a campus, a classroom, a hospital, an intensive care unit (ICU), an airport, a bus station/train station/transportation venue, a mall and specific store or common area at the mall, or a government owned property. In the category of a private locale, there can be a private residence, multiple-dwelling unit building or complex, a private school, a private business location, multi-tenant office complex, or a privately owned property.

A locale may also impose certain control requirements on devices operating in the locale. This is shown in FIG. 3 as locale control requirement 340. For example, a church may require that all mobile devices have their ringers off and be in a no-call state during certain activities such as during a sermon. In some embodiments, control requirements may be conditional. For example, the condition may relate to timing. If a sermon is given at 10:00 a.m. on Sunday at a church, the condition for a control requirement may be 10:00 a.m. and the associated control requirement may be "turn off the ringer". In this case, when the date and time recorded inside the mobile device 112 satisfy "Sunday" and "10:00 a.m.," the conditional control requirement may be enforced automatically if the user is actually at the venue and in the room, as would be evident from the venue's CQTS and VRI contactlessly coupled to the user's device, and (for example) if the user had previously authorized action based on this specific venue's recurring control command. In this example, ringing would be automatically restored immediately when the user leaves the room where the sermon is underway, or earlier if the venue issues a command to end its control session, e.g. as would be desirable immediately at the conclusion of the sermon.

In some embodiments, a control requirement may interrogate a mobile device to perform self-identification or anonymous presence affirmation when at the entry point of the venue/locale, either conditionally or unconditionally. Such control requirements may be specified based on, e.g., security measures, and may be imposed to require all or some mobile devices in the locale to submit, automatically, the corresponding information (but subject to suitable privacy and security protections and the desires of the user). For example the venue's control command via its CQTS could direct the user's device (upon the user's arrival at the venue) to wirelessly ping via the venue's LAN to provide the requested information or anonymous presence affirmation. The information could then be used by the venue to allow physical access to the venue, or for venue-selected network access, or to permit a transaction (such as in electronic or mobile commerce or vending), or to provide special content or incentives to the user—for example to reward the user with a discount or premium for physically visiting the venue, such as would be done to encourage in-person visits by potential customers to a store. The fact that an actual visit occurred, even if anonymous, could be verified and recorded by the means herein, subject to the concurrence of the user to participate, and subject to suitable privacy and security provisions.

An exemplary application of venue based device control may be found where a large audience has gathered in a locale such as an auditorium or theater where respectful device-silence is desired during a presentation. In a theater, for example, an opening announcement might be played over the public address sound system requesting that everyone turn off wireless phones, or reminding them that all portable electronic devices be set to "silent mode" (also known as "manner mode") to prevent audible ringing and alerts not related to safety or emergencies. Instead of answering routine incoming calls, for example, the calls could automatically go to voice mail and messages could be stored for later retrieval by the respective users. Further, a movie theater may require that all cameras be in an OFF state during the show and could issue control commands via its CQTS to that effect. The venue-issued control commands would cease to be effective upon a user's device when that user leaves the controlled position at the venue; or when the user elects to override or deny the venue's control attempt; or when the venue issues a command to relinquish its control (i.e. to end its control session) including when a duration-specific control period has passed, for example upon an event's conclusion.

Venue-based controls would not be attempted, facilitated or imposed on inbound and outbound emergency calls (such as calls to/from 911 or using E911), emergency alerts or related messages, except to assist and promote the immediate, unimpeded success of such communications in accordance with all laws and regulations, and subject to suitable privacy and security protections as provided by authorities, venues, users and networks in each instance. Further, in preferred embodiments, the device user could (manually or via user-programmed instruction) override or deny any or all venue-issued control commands coupled to that user's device. An important aspect of this invention is that a user's device that is initially powered off or silenced can be commanded by the venue to be turned on and made operational in order to receive and indicate, such as by audible means, the presence of emergency messages or venue-based alerts.

At such locales, various low power signal sources existing in the locale may be utilized to phase-lock the CQTS and venue relevant information and to propagate the thusly coordinated low power signals via the air or through distance and to contactlessly impart such signals directly on devices and/or contactlessly on individuals, from where the mobile devices can intercept the signals, e.g. by virtue of mobile device-to-human contact or proximity. Electric and magnetic fields, or electromagnetic waves emitted by venue-intrinsic infrastructure (e.g. the AC wave contactlessly emitted or imparted by a power supply wire, utility meter, or by any electrical equipment) may also serve as such signal sources. Alternatively, in an acoustic embodiment presented herein, non-phase-locked CQTS emitted as sound waves from either an initial source such as a venue's sound system and loudspeaker or a reflective source may be used to impart VRI.

Figure 4A:
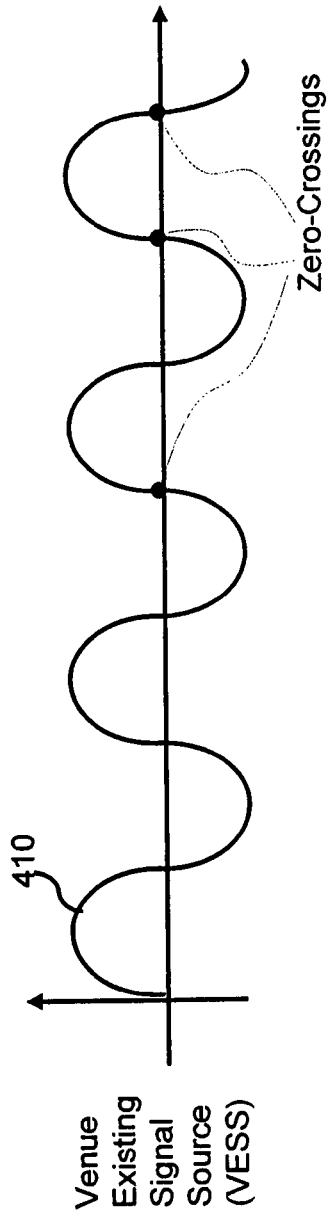
Figure 4B:
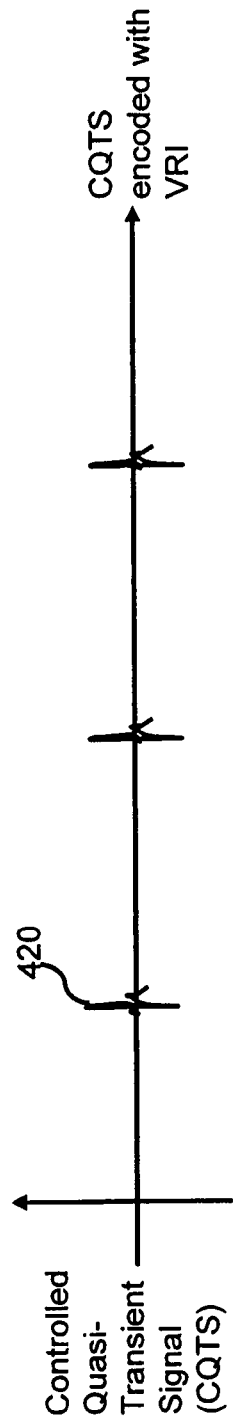

FIGS. 4a-4d illustrate, but not to scale, an exemplary VESS, the venue-intrinsic signal before it is emitted by the infrastructure at a venue (FIG. 4a), an exemplary quasi-transient signal coded with venue relevant information, and exemplary controlled quasi-transient signals coded with venue relevant information and distributed at a venue along the same paths taken by the VESS, according to an embodiment of the present teaching. FIG. 4a shows a venue-intrinsic signal 410 as a high-voltage AC wave prior to its artifacts being emitted (i.e. as directly viewed by an oscilloscope with its vertical-input probes in contact with the source) from an AC power branch circuit (i.e. a VESS). The points where the AC wave crosses zero voltage are noted and may have special significance as will be explained. FIG. 4b shows a quasi-transient signal 420 generated by a venue relevant information generator and coded with venue relevant information associated with a locale. As shown, the quasi-transient signal 420 may be intermittent or come in bursts and possibly may be periodic in a certain period. FIGS. 4c and 4d illustrate observations of contactlessly coupled waveforms as would be viewed on an oscilloscope. These contactless signal artifacts are minuscule compared to what is shown in FIG. 4a. FIG. 4c illustrates the controlled quasi-transient signal 430 formed by phase-locking a controlled quasi-transient signal to a low power VESS with the quasi-transient signal locked onto a certain phase of the low power VESS. FIG. 4c illustrates a different controlled quasi-transient signal 440 formed by the same quasi-transient signal on the same low power transient signal (and carried by the same venue-intrinsic infrastructure) but with the quasi-transient signal locked at a different phase. Because the zero-crossing points of the AC wave are used as clock- or switching-references in some equipment, the occurrence of CQTS can be locked to points on the wave other than at the zero-crossings, thus avoiding the creation of interference to other equipment at a venue. Conversely, if interfering transients or energy from venue-based equipment are discovered to occur regularly at certain points on the AC wave, or within certain frequency spectra, the CQTS can be adjusted to avoid the timing or spectrum of the interfering transients or energy. Phase-locking of the CQTS to the VESS also aids in the detection and demodulation of weak CQTS, for example CQTS at or near the noise level. Spread spectrum and coding techniques can also be used to enhance the robustness of CQTS, particularly when below the noise level, thus enhancing the recovery of VRI information contactlessly imparted to a user's device.

A locale requirement enforced in connection with different time periods may have many different applications. For example, a school may require that all students' phones be off during certain time periods such as class times and allow such phones to be turned on between classes. In this case, the locale command generator 550 may operate according to certain programs provided by the locale information-programming unit 520 and the states of the locale system clock 570. Appropriate command(s) may be generated at certain time periods to control students' phones accordingly while they are in school.

Particularly in a school environment, the devices held by various types of users will respond in different ways to the school's venue- and locale-issued VRI and control commands. Each user's device can have its own school-policy-appropriate behavior, tailored to whether the individual is a teacher, administrator, worker, police authority, visiting parent, student, etc., although all of the individuals are present at the venue and in and around the same classrooms and common areas on the school property. For example, the control hierarchy herein could allow a teacher's phone to ring, text-message, and to access outside networks while in a classroom, but at the same time not allow a student's phone to ring, text-message, or access non-school provided networks, (or not to have other controlled features, such as video recording) while within the same classroom, for example at times when the class is actually in session. Venue-selected controls on students' devices could be ended at other times, such as during after-school hours. Others' devices, such as those used by administrators, police and parents, could have control hierarchies set to ignore the school's venue-issued commands but can use any desired aspects of venue-control, such as VRI, for emergency location, subject to suitable privacy and security provisions. In preferred embodiments, the address within the VRI would be encrypted using suitably strong, changing codes so as to be meaningful only to the user and to authorities responding to an emergency call. An Within the school venue, certain rooms, such as the nurse's office, could have their own CQTS and VRI set to allow all phones to ring at any time and to permit uncontrolled access to outside networks for all users, including students. School-related controls on an individual's device controls would also cease when the individual leaves the school property.

A locale requirement may impose that no venue-based restrictions be placed on emergency communications at any place and regardless of the device or user except to facilitate the immediate and unimpeded success of communications such as 911 and E911 calls and messages, both originating and terminating (i.e. incoming and outgoing) as required by law and regulation. An important aspect of this invention is that a user's device that is initially powered off or silenced can be commanded by the venue to be turned on and made operational in order to receive and indicate, such as by audible means, the presence of emergency messages or venue-based alerts.

Another important objective may be to have unanswered calls automatically routed to the user's voice-mailbox for later retrieval when convenient for the user as would normally be done by a network provider. Functions such as voice-mail routing and text message storage would continue to be active for all devices regardless of venue-invoked commands or controls.

Figure 5:
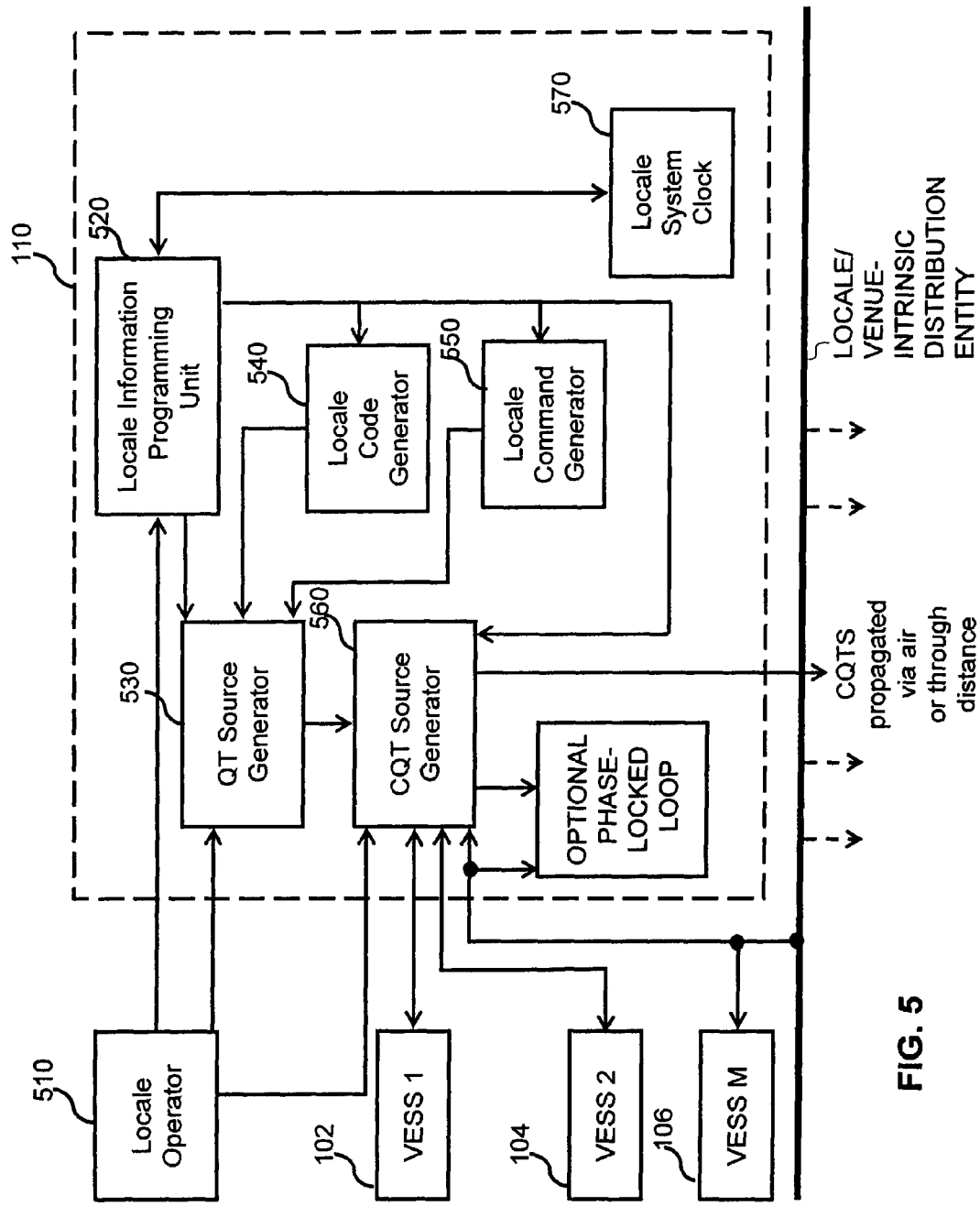
FIG. 5 depicts an exemplary construction of a venue relevant information generator (VRIG), according to an embodiment of the present teaching.

FIG. 5 depicts an exemplary construction of a venue relevant information generator (VRIG) 110 (see FIG. 1), according to an embodiment of the present teaching. The exemplary VRIG 110 comprises a controlled quasi-transient signal (CQTS) generator 560 and a quasi-transient (QT) source generator 530. The CQTS generator 560 is activated, i.e. electrically driven by a QT signal, generated by the QT source generator 530 to produce a controlled quasi-transient signal (CQTS) to be emitted into the air or through distance. The QT source generator provides a low-average-power signal coded with venue relevant information. The venue relevant information to be coded is associated with the locale of the VRIG 110.

The venue relevant information to be coded may be fixed with respect to a locale, may be programmed or dynamically configured as a function of time or events, or may be generated by combining fixed information with programmed or dynamic information. For example, the address associated with a locale may be fixed yet the locale's control requirements thereof may be time- and/or event-dependent. To determine venue relevant information to be coded, the QT source generator 530 may optionally interact with a locale operator 510, a locale code generator 540 e.g. that provides the exact semantic address and room of the venue, or a locale command generator. In some embodiments, the locale information programming unit 520 may control the locale code generator 540 or the locale command generator 550 based on, e.g., a locale system clock 570 to determine the timing or condition under which certain venue relevant information is to be generated for venue-based control of devices at the venue.

The locale operator 510 may interface with a locale information-programming unit 520 to, e.g., determine a particular program that controls the timing or determine the conditions under which a sequence of venue information is to be generated. The locale command generator 550 may be responsible for generating certain codes indicating the device control functions to be initiated at the locale based on a pre-determined program and the states of the system clock. For example, a school's locale command generator 550 may be programmed so that, during weekdays, it serves to create venue-based controls consistent with school policies, and during weekends, e.g. when the building it is used privately or for other purposes, a different set of device control commands, or no control commands, are initiated. In this case, depending on the day or time, different control codes may be generated by the locale command generator 550. In order that position information is always available, the locale code generator 540 can continue to output the venue's (encrypted) semantic address to modulate the CQTS at all times. In preferred embodiments, said address would be encrypted to be meaningful only to authorities responding to an emergency call, e.g. from a user at the locale.

The locale command generator 550 may be responsible for generating venue relevant information in the form of commands to enforce associated locale requirements. Depending on the requirement, each command may be associated with a duration for which the command is to be in force. Alternatively, a command may be repeatedly generated for the duration intended. Furthermore, a command to enforce a requirement may be followed by a different command, e.g., "keep alive" command, indicating that the previous command is still in effect. In this case, the initial command enforcing a requirement will be in force as long as it is followed by a "keep alive" command. The initial command may be discontinued when either there is no more "keep alive" command for a specified period of time or another command indicates the termination explicitly.

Data from the locale code generator 540, and the locale command generator 550, possibly coupled with some time-duration codes, or periodic "keep alive" signals, may be fed to the quasi-transient source generator 530, which then encodes such data in the form of quasi-transient signals (as shown in FIG. 5). The quasi-transient signals coded with locale relevant information is then sent to the controlled quasi-transient signal generator 560.

The controlled quasi-transient signal generator 560 produces the actual information-bearing low-average-power controlled quasi-transient signals in the audio-frequency range, that if used jointly with a non-acoustic embodiment as also described herein, can optionally be phase-locked to one or more of the electrical VESS sources 102, 104, . . . , 106. In the acoustic embodiment, the CQTS can be an audio signal, tones, chords, infrasonic/ultrasonic signals, or any other signals that can be emitted by a loudspeaker that is part of the existing sound system in the locale. For example, audio-frequency sets, tones, chords and wave-shapes are fed to the public address sound system audio power amplifiers and in-room speakers and used to carry the desired venue relevant information in a low power signal form, to be propagated via air in the locale. Alternatively, other signals, quasi-transient signals and/or combinations thereof, differing tone sequences or patterns of any suitable configuration could be used by those skilled in the art to communicate the desired venue relevant information.

When the CQTS is a sound signal such as audio, the output of the CQTS generator 560 may be sent to an audio amplifier and propagated acoustically in air by, e.g., speakers in the locale. Such a signal source may have an audio frequency within the range of human hearing and perception. Alternatively, some acoustic signal sources may be outside that range, e.g. infrasonic or ultrasonic, but within the respective frequency response characteristics and practical limits of the receptor(s) within the mobile device 112.

The above alternative choices of audible versus inaudible audio characteristics for the CQTS raise some noteworthy issues. If the acoustically propagated and coupled control commands are within the range of human hearing and perception, the noise thus created, although quasi-transient and brief, could be objectionable or distracting to those hearing it, especially if repeated loudly or frequently. In some embodiments, human-audible acoustically coupled control signals may be an appropriate type of CQTS if used occasionally and may not be appropriate if used continuously to convey venue-relevant information or periodic "keep alive" signals. In such situations, Infrasonic or ultrasonic frequencies outside the range of human hearing, sub-audible signals, or quasi-transient wave segments comprising brief sound pulses that are too short or weak to be perceived or objectionable may be alternative choices of CQTS.

When the aspects of the present teaching are applied in the context of informed consent regarding device control, CQTS in the form of clearly audible audio signals may be appropriate or even desirable if the CQTS is amplified and broadcast in a locale to notify device users, e.g. in an audience, so that all parties have the opportunity to permit or deny venue-based device control in each instance. The device user, duly notified, may be allowed to retain control over the device. Such notification may also be achieved by a live, a recorded, or a synthesized (see below) announcement to that effect, e.g., at the beginning of an event during which device control is attempted by the venue, and at its conclusion.

In some embodiments, the locale information-programming unit 520 may also control the QT source generator 530 as to what venue relevant information to select from either by the locale code generator 540 or the locale command generator 550. For example, the address of the locale may be selected in one instance and utility account information may be selected in another instance as venue relevant information to be imparted by the CQTS. In preferred embodiments, the venue's suitably encrypted semantic address would be frequently and routinely repeated so as to be available for coupling to users' devices in the event of an emergency call made by a user at that locale. Such control may be programmed in the locale information-programming unit 520 or re-configured by the locale operator 510. Alternatively, the locale operator 510 may also directly control the QT source generator 530 as to the selection of venue relevant information.

Similarly, the CQTS generator 560 may be controlled by the locale information programming unit 520 or the locale operator 510 as to what existing signal is to be selected as the source with which the quasi-transient signals coded with the selected venue relevant information is coupled. The locale information-programming unit 520 may be configured to control the CQTS generator 560 to select a signal source that appears to be the strongest, if jointly used with an alternative non-acoustic embodiment also described herein. It may also control the selection according to some time-based or event-based schedule. For instance, an acoustic signal source may be preferred when there is a broadcast such as in an auditorium or theater. Otherwise, non-acoustic CQTS coupling may be preferred.

In some embodiments, the CQTS generator 560 may also be controlled by the locale operator 510. Optionally, the CQTS generator 560 may be jointly controlled by the locale operator 510 and the locale information-programming unit 520. For example, when the locale operator 510 initiates a broadcast operation, it may signal the locale information-programming unit 520, which can subsequently control the CQTS generator 560 to select an acoustic CQTS as a source to propagate venue relevant information.

When the selected CQTS source is an acoustic signal, the CQTS generator 560 is electrically driven by the quasi-transient signal from the QT source generator 530 coded with the selected venue relevant information. In some embodiments, the QT signal precedes, is superimposed upon, or follows spoken announcements on the venue's sound system that emanate from a loudspeaker to the air. Since the CQTS signal is weak, it is generally not audible or objectionable and therefore does not affect or change the quality of perception of the original audio that the audience hears.

Figure 6:
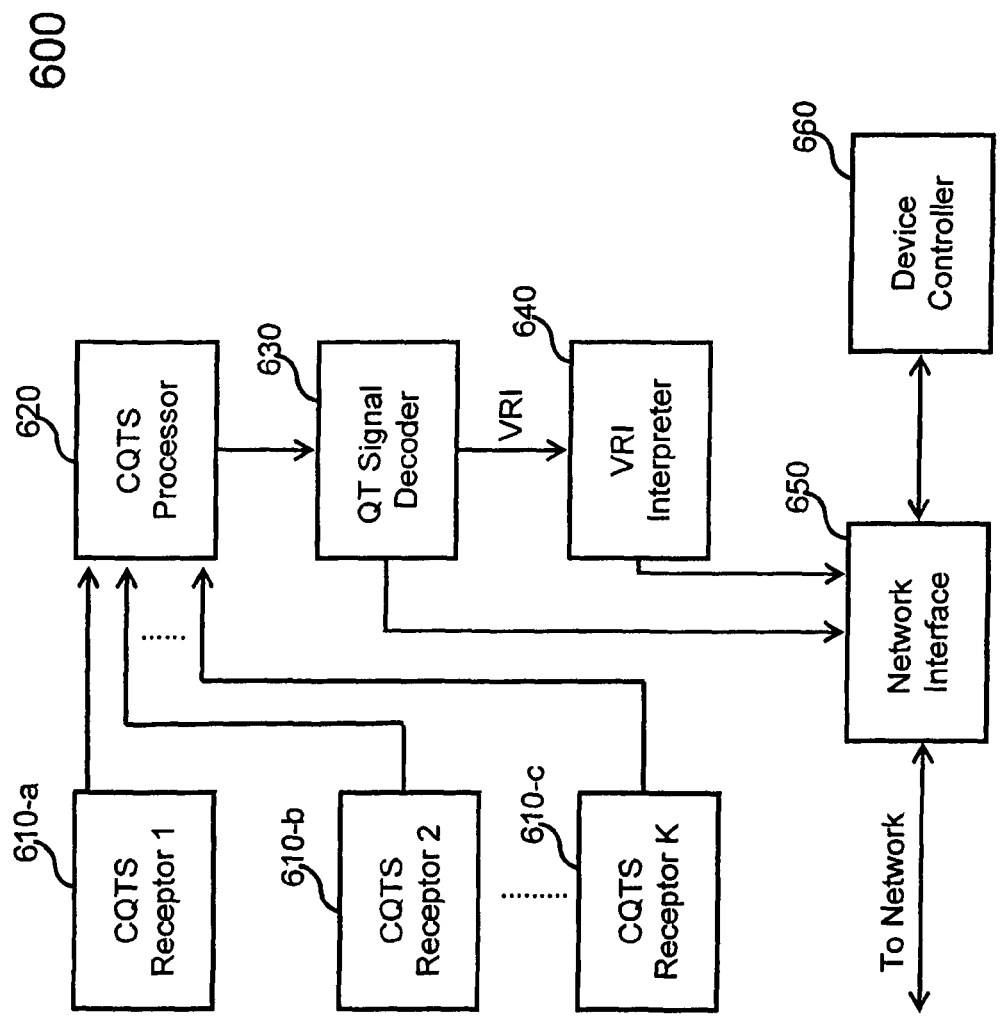
FIG. 6 depicts an exemplary construct of part of a mobile device capable of venue based device control based on venue relevant information extracted from controlled quasi-transient signals modulated on a VESS, according to an embodiment of the present teaching.

When the controlled quasi-transient signal is propagated in the air, it is received by or coupled to the mobile device 112. In some embodiments, such reception may be via the air. In other embodiments such as non-acoustic options also described herein, such reception may be achieved through direct touch or proximity. FIG. 6 depicts an exemplary partial diagram 600 inside of a mobile device related to venue based device control, according to an embodiment of the present teaching. The diagram 600 comprises one or more controlled quasi-transient signal (CQTS) receptors 610-*a*, 610-*b*, ..., 610-*c*, a controlled quasi-transient signal (CQTS) processor 620, a QT signal decoder 630, a venue relevant information interpreter 640, a network interface 650, and a device controller 660.

A CQTS receptor is a receiver that is sensitive to low power signals. For example, the mouthpiece or an earpiece of a telephone may be made receptive to an acoustic sound signal which corresponds to a low power CQTS. Typically, a wireless phone has at least two convenient, existing transducers that are used herein as acoustic CQTS receptors. One exemplary receptor is a telephone mouthpiece, which contains a microphone, usually an electret type of transducer, that converts the user's voice into an audio-frequency (AF) electrical signal as required in order to transmit voice during a telephone call.

Such a microphone may be made receptive to ambient sounds at all times, not just during a call. In particular, a microphone in a phone may also be receptive to a controlled quasi-transient sound wave that is used to convey venue relevant information or commands. In general, the frequency response of an electret microphone can cover not only the frequency range of human hearing (usually stated to be 20 to 20,000 cycles per second) but often is also responsive outside of that range to a certain degree with some upper and lower bounds in practice.

A typical phone also includes an earpiece (or earphone) that contains a small speaker, often designed for use adjacent to the user's ear. Such a speaker usually is a dynamic transducer having a voice-coil and magnet, which produces the sound based on received signals to allow a user to hear the words the other party utters during a telephone call. Such conventionally constructed earpiece in a phone can be used, in a different manner, as a CQTS receptor such as a sound receptor rather than as a sound producer. Such a CQTS receptor can be made active at all times, not necessarily only during a call and not necessarily near a user's ear. Although the frequency response of such a transducer may be limited compared with an electret microphone, such an earpiece used to sense sound (instead of to produce sound) could be receptive to a controlled quasi-transient acoustic signal in a locale that is used to convey venue relevant information or commands.

In addition, certain phones have other sound-making devices, such as piezoelectric ringers, with different frequency response characteristics that may also be used herein as CQTS receptors in a similar manner. In some situations, the mouthpiece and earpiece associated with a phone may be external to the phone, e.g., a hands-free device such as a headset. Such pieces may also serve as CQTS receptors for the purposes described herein. Furthermore, separate transducers deployed specifically for sensing CQTS signals may also be used, particularly where a particular type of device has no suitable existing transducer.

In some embodiments, more than one transducer may be used to provide a wider range of response-characteristic options, higher sound sensitivity, less directionality, or broader or overlapping frequency response ranges that may be extended to infrasonic and ultrasonic signals. Multiple transducers may also provide some diversity in case one or more of them become shielded from ambient sounds due to sound attenuation caused by, e.g., clamshell-like folding of the phone, flip- or slider-type closures, and coverings such as clothing, pocket or purse, etc.

Conventional designs of clamshell-like folding phones or those having sliding enclosures do not expressly require that the phone's microphone, earpiece or the like be exposed for sound reception when the phone's case is closed. In the teachings described herein, a device's design may be such that the device does not attenuate the sound and prevent it from entering the microphone or any transducer of the device when the device is folded or closed. In preferred embodiments, the microphone or other transducers of the device are not covered by the case of the device. Alternatively, the case of a device may provide a hole or an opening over or leading to each microphone or transducer (as used herein) when the case is closed to allow a physical channel for the ambient sounds and to minimize acoustic attenuation.

In some embodiments, an electronic device configured to receive other forms of low power signals, such as infrasonic or ultrasonic signals, has a transducer or receptor sensitive to a frequency range corresponding to such signals. Such a transducer or receptor may also serve as a CQTS receptor for controlled quasi-transient signals.

The CQTS processor 620, as depicted in FIG. 6, takes the output(s) of the CQTS receptors 610-*a*, . . . , 610-*c*, as inputs and performs appropriate processing on the received controlled QT signals. QT signals coded with venue relevant information and superimposed on a low power signal source may be detected and extracted. In some embodiments, demodulation may be performed on the received controlled QT signals to separate the coded venue relevant information. Such demodulation may be achieved by any signal processing method known by persons skilled in the art. For example, frequency based filtering may be employed to extract QT signals with a frequency of above 18,000 Hz.

The separated QT signal may be further amplified and/or filtered by the CQTS processor 620, which may be configured to be sensitive to the frequencies and signal forms of the QT signals generated by the QT generator 530 (see FIG. 5). The QT signal processor 620 may then output the processed signals to the QT signal decoder 630. As described herein, the QT signals are received via low power signals existing in a locale encode venue relevant information. To obtain the venue relevant information, the QT signal decoder 630 may decode the processed QT signals to obtain data representing the venue relevant information. For example, the processed QT signals may be in analog form and the QT signals may be decoded to derive data in other forms such as digital or binary data.

To determine the content of the venue relevant information, the venue relevant information (VRI) interpreter 640 may further process the decoded data from the QT signal decoder 630 to determine the meaning of the venue relevant information. For example, from decoded binary data, the VRI interpreter 640 may determine that the received venue relevant information corresponds to "church" (e.g., a classification of the locale) and "ringer OFF" (e.g., a requirement associated with the church at that particular time). Such determination may be made by associating each command or type of information with a pre-defined pattern of data or signals. For instance, certain representation of binary bits derived from analog signals may correspond to a given command. Such interpretation may be achieved via a hardware look-up table, by a state machine, by database query, or by some software. Patterns may also be defined based on other form of information such as audio tone frequencies, chords, wave shapes, a combination thereof, or any suitable configuration of what those skilled in the art would use to communicate the desired information or commands.

As described herein, a device control decision may be made either within the device itself based on received venue relevant information or by an outside or external venue based device control decision unit 240 (see FIG. 2*b*). In the former operational mode, the device controller 660 may be used to make a device control decision and execution thereof. In this case, the venue relevant information derived by the VRI interpreter 640 is received by the device controller 660 and used for device control. In some embodiments, the device controller 660 may be implemented as part of an existing microprocessor of the mobile device 112. For example, if the mobile device 112 corresponds to a mobile phone, which generally includes a microprocessor therein, configured for controlling the operation of the mobile phone. In this case, the device controller 660 may be a part of the mobile phone's microprocessor designed to exercise device control based on received venue relevant information. An exemplary mobile station incorporating conventional components/features and additional components/features to implement the present teachings described herein is discussed in detail with reference to FIG. 8.

In the latter operational mode, the derived venue relevant information is sent to the network interface 650, which may be responsible for interfacing with an external network for dispatching the venue relevant information to the venue based device control decision unit 240 and/or receiving a device control command therefrom. Alternatively, the mobile device 112 may send decoded quasi-transient signals from the QT signal decoder 630, rather than interpreted VRI, to the venue based device control decision unit 240 via the network interface so that both the interpretation and the device control decisions are made externally. As described herein, the mobile device 112 may operate in a stand-alone mode, a networked mode, or a mixed stand-alone and networked mode depending on the dynamics of its operation.

The network interface 650 may be deployed inside of the mobile device 112 and used to establish uni-directional or bi-directional communications between the outside world and other components of the device (e.g., the decoder 630, the interpreter 640, or the device controller 660) via a network. The network interface 650 may also have additional links. Exemplary links include a link to control the actual command execution status of the mobile device phone itself, or a link to the user's programmed commands and manual/override instructions.

The network interface 650 may allow a network to deliver a command generated by, e.g., a network operator, to override an instruction from, e.g., either an internal command of the device or an external command from an external device control decision unit. The overriding scheme may be according to an established control hierarchy as stipulated in a binding document such as a contract, a technical requirement, a policy, established law or regulation, or as needed in emergencies.

The network interface 650 may store a device control history associated with the underlying device or the user's encrypted position location data (see below). Such stored data may be used for a variety of purposes, including facilitating in locating the user in emergency situations or in making networked device control decisions. For example, the network interface 650 may be used to ensure that safety or emergency messages, coded as such by an authorized sender or network, can override any user- or venue-commanded control by ringing through immediately. Unrestricted and uncontrolled outgoing calls and messages originated by any user of any mobile device, and unimpeded return-calls and messages from responding authorities, would always be allowed at any location.

The present teaching can be applied in various types of portable electronic devices. In the case of devices for wireless communication, the present teaching can be applied independent of radio-frequency bands, air interface/access technologies such as code division multiple access (CDMA), global system for mobile (GSM), orthogonal frequency division multiplex (OFDM), ultra-wideband (UWB), independent of selected wireless providers and types of networks, whether commercial wide area network (WAN) or private local area network (LAN) including IEEE Standards 802.11 and 802.16, etc., and including unlicensed Voice over Internet Protocol (VoIP) nodes. Regarding the position-location aspects, the present teaching can be applied in conjunction with mobile devices to provide improvement or to replace existing location based systems in mobile devices.

Figure 7:
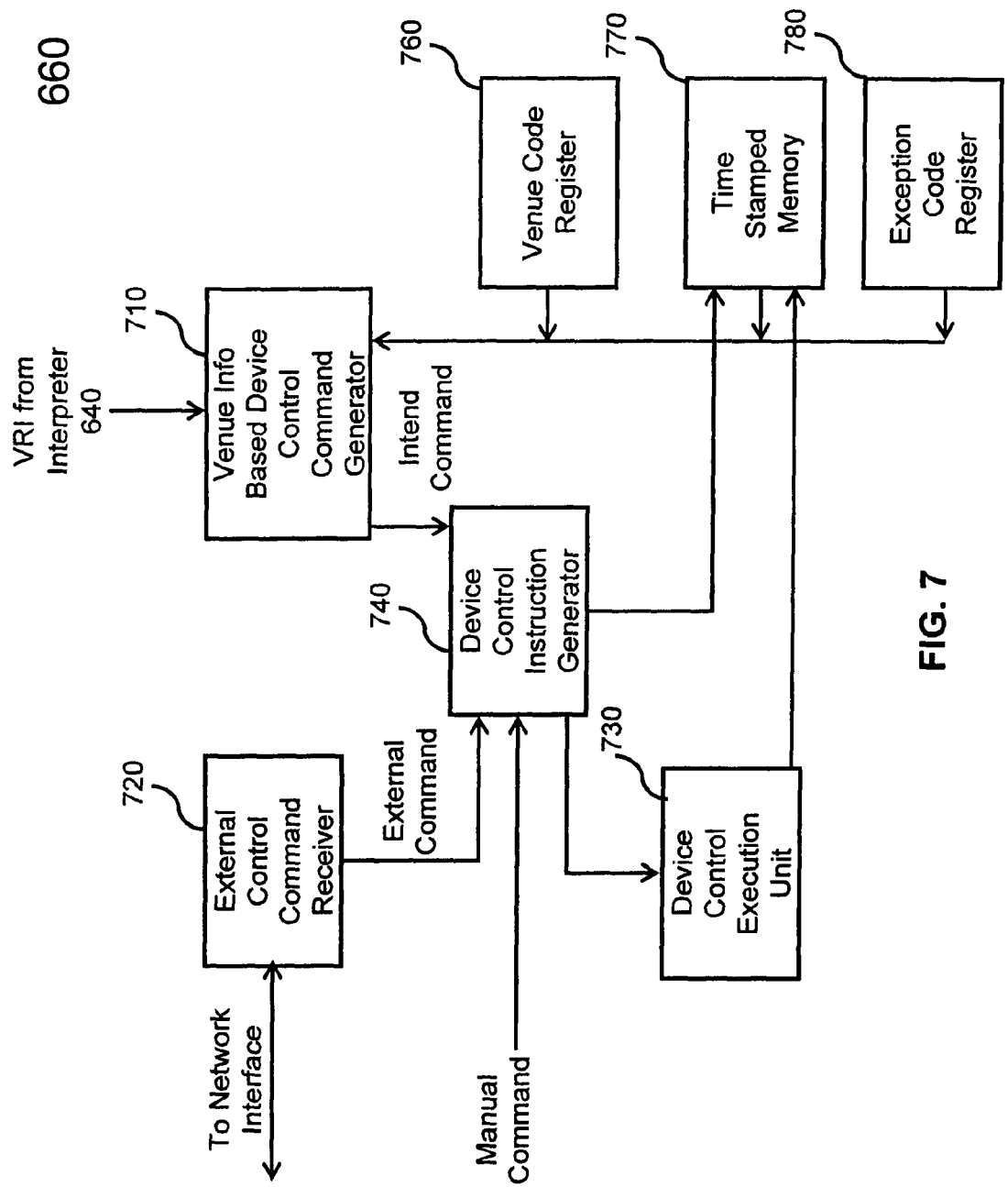
FIG. 7 depicts an exemplary construct of a device controller in a mobile device for venue based device control, according to an embodiment of the present teaching.

FIG. 7 depicts an exemplary construct of the device controller 660 for venue based device control, according to an embodiment of the present teaching. As discussed earlier, the device controller 660 for device control based on venue relevant information may be part of a processing unit of the mobile device 112. An exemplary construct of a mobile station having both conventional components/features and components/features for venue based device control is provided with reference to FIG. 8. The intrinsic characteristics of the device controller 660 for venue based device control is first described.

In FIG. 7, the exemplary device controller 660 comprises a device control instruction generator 740, and a device control execution unit 730. Depending on whether the mobile device 112 is configured to operate stand-alone or in a networked mode, the device controller 660 may additionally include different components. If the mobile device 112 operates in a networked mode, i.e., a device control decision is made externally; the control instruction generator 740 may receive a device control command via an external control command receiver 720, which may be connected to the network interface 650. If the mobile device 112 is configured to be able to self control, the device controller 660 may also optionally include a venue information based device control command generator 710, which receives VRI from the VRI interpreter 640 and generates an internal device control command based on venue relevant information received from the VRI interpreter 640.

The device control instruction generator 740 may generate device control instructions directed to control specific parts of the mobile device 112 based on an external command from the external control command receiver 720 or an internal command from the venue information based device control command generator 710. The generated instructions may then be sent to the device control execution unit 730 where corresponding controls defined by the instructions are carried out. The device control instruction generator 740 and the device control execution unit 730 may alternatively be integrated as a single component.

The device control instruction generator 740 and the device control execution unit 730 may be implemented as an additional part of a microprocessor in a conventional mobile device. For example, in a mobile station such as a cellular phone, a microprocessor may be included that can issue instructions for control different parts of the mobile station based on different triggering events. An instruction to shut off the ringer of the phone may be generated when a user presses a certain control button on the mobile station. In this case, the device control instruction generator 740 may be an integral part of both conventional function and function of device control based on venue information. As illustrated, the device control instruction generator 740 may also take a manual command from outside and generate a corresponding device control instruction. In addition, the device control execution unit 730 may be constructed in a similar fashion as a conventional mobile device but capable of executing an instruction issued based on the content of venue relevant information.

When the venue information based device control command generator 710 generates an internal device control command, it may utilize not only the venue relevant information from the VRI interpreter 640 but also other types of information stored in the mobile device 112. For example, the device controller 660 may control the device state based on the previous state the device is in. In some embodiments, the device controller 660 may also control the device based on a timer. In other embodiments, the device controller 660 may control the device by matching received venue information with some pre-stored specific types of venue. To serve such purposes, the device controller 660 may optionally include a venue code register 760 for storing various venue codes, a time-stamped memory 770 for storing various device state information with associated timing information, or an exception code register 780 for storing different exceptions to device control applicable to the mobile device 112.

The venue code register 760 may be used for storing various types of venue classification, which can be matched against for device control purposes. For example, for each stored venue code, a corresponding device control command may also be stored so that when the received venue relevant information matches the venue code stored in the venue code register 760, the corresponding device control command will be triggered or generated by the venue information based device control command generator 710. For instance, a particular venue code stored may be a classroom and its corresponding command may be "ringer OFF". In this case, if the received venue relevant information indicates that the locale the mobile device 112 is in is a classroom, there is a match against the stored venue code and the device control command "ringer OFF" may be generated as an internal command.

There can be different usages of the venue code register 760. Received venue relevant information may be stored in the venue code register 760 to indicate the venue in which the device is currently in and the corresponding device control that is exercised on the device. When venue relevant information is continuously received, the venue information based device control command generator 760 may compare the newly received venue information with the stored venue information. If a mismatch is found, the venue information based device control command generator 710 may accordingly terminate the current device control, which may be appropriate only with respect to the previous venue that the device was in. For example, when a mobile phone user walks out of a classroom where the phone's ringer may be automatically turned off, the phone's ringer may be automatically turned back on when the new venue information indicating so is received.

The content stored in the venue code register 760 may be programmable. It may be programmed by a service provider, a network provider, a third party service provider, or a user of the mobile device. The content of the venue code register 760 may be fixed prior to when a mobile device is released into use. Alternatively, the venue code register 760 may be re-configured after its initial setup. The correspondence between a venue code and an associated device control command may be overridden by setting up exceptions in the exception code register 780.

The time-stamped memory 770 may store the mobile device's time-stamped control history, timer controlled device control commands, or current status and recent history of the user's encrypted position-location. Such data and encrypted position-location information may be used by the venue information based device control command generator 710 to determine when to issue what command. The data stored in the time-stamped memory may also be updated by the device control instruction generator 740, when new time sensitive instructions are generated, or by the device control execution unit 730. Data stored in the time stamped memory 770 may also be provided to an external networked server in making control decisions (not shown).

Current and recent time-stamped history of a user's position-location may be used in applications such as in emergency response by authorities in locating the caller. A mobile device may be configured to provide a user the option of manipulating the content of the time stamped memory or deactivating the time stamped memory. In preferred embodiments, said address information would be securely encrypted, e.g. for use by authorities responding to an emergency call.

Different components such as a venue code register 760, time stamped memory 770, or the exception code register 780 may be preferably built-in inside of the mobile device. Such components may also be optionally or additionally provided outside of the mobile device such as within a network server or a service provider facility.

The device controller 660, as described herein, may be programmed by a user, a service provider, or a network operator to be responsive to commands instantly and permanently as they are received and until a different command is received. In some embodiments, such a device controller may also be configured to be responsive only for time-durations as set by a user, a service provider, or a network operator. In some embodiments, such a device controller may be configured to be responsive only to a list of chosen venue types or locations authorized and inputted by a user, a service provider, or a network operator. For example, a mobile phone may be controlled only when the received venue information matches the address programmed in the venue code register 760.

Further, if desired by the user, the control of a device may be programmed to delay compliance with (or ignore) a venue's control command, for example so as not to disrupt a call already in progress at the instant when a control command is first issued by the venue. In that instance, as a convenience to the user, the device could produce a sound in its earpiece (or use other indicator means) to inform the user of the venue's request that the user promptly conclude the present call or, optionally, leave the room.

Figure 8:
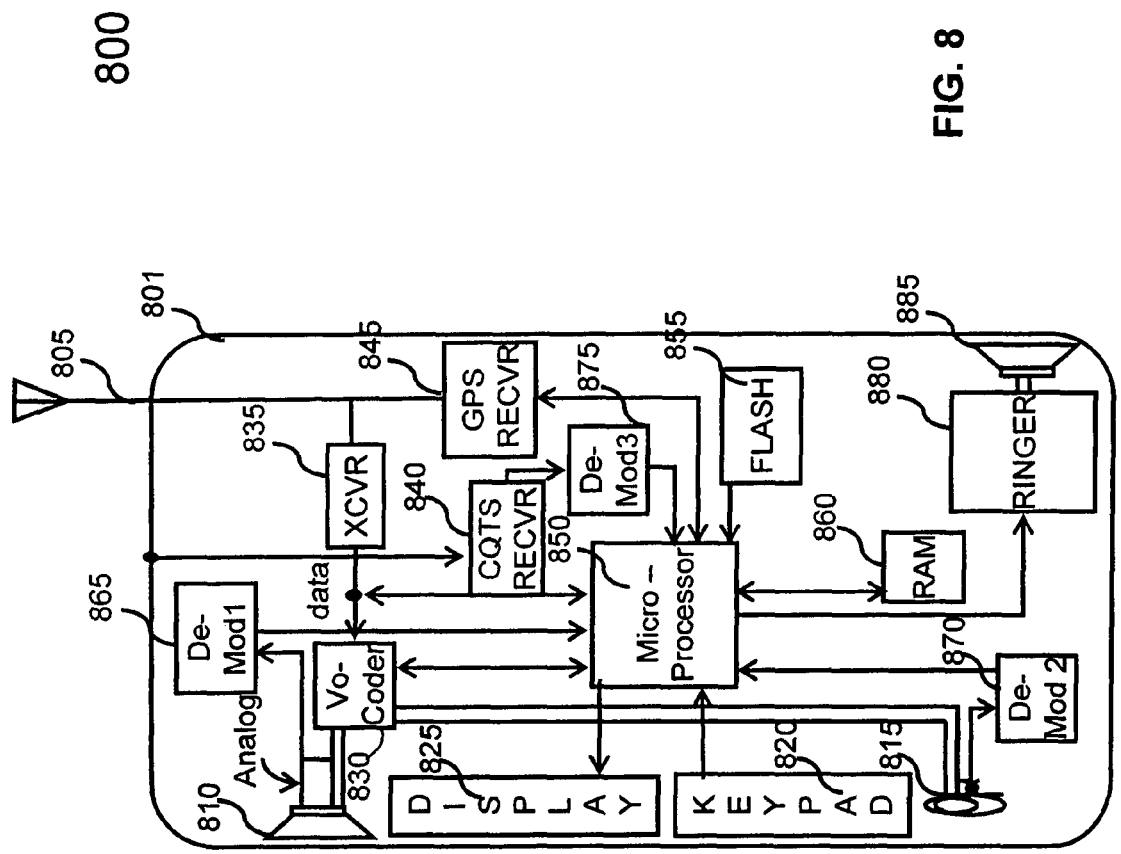
FIG. 8 depicts an exemplary construct of a mobile device incorporating the present teaching.

FIG. 8 depicts an exemplary construct of a mobile station 800 that is capable of venue based device control, according to an embodiment of the present teaching. The mobile station 800 comprises a housing 801, which encloses a plurality of components, including an antenna 805 including possible duplexer or triplexer arrangement (not shown), a speaker 810, a microphone 815, a keypad 820, a display panel 825, a voice coder/decoder (vocoder) 830 including audio amplifier (not shown), a transceiver 835, a CQT receiver 840, a RAM memory 860, a microprocessor 850, and a ringer unit 880. In addition, the mobile station 800 may also comprise a GPS receiver 845 and a flash memory 855. Furthermore, the mobile station 800 may include one or more demodulation components such as demodulator 1 865, demodulator 2 870, and demodulator 3 875. The ringer unit 880 may have its own speaker 885 or it may share a speaker with the voice coder/decoder (vocoder) 830 including audio amplifier (not shown).

In conventional operation, when a user makes a connection, information keyed in from the keypad 820 is sent to the microprocessor 850. For example, such keyed information can be a phone number, an URL, or an email address. Such information may be coded and then sent to the transceiver 835 to be transmitted via the antenna 805 to a wireless network (not shown). When the transceiver 835 receives a signal via the antenna 805 from a wireless network, the received signal is sent to appropriate components inside of the mobile station 800 in order to be processed.

If the received signal corresponds to voice data, the voice signal may be sent to the voice coder/decoder (vocoder) 830, including audio amplifier (not shown), where the voice signal may be converted (e.g., analog to digital conversion), decoded or otherwise processed so that the audio signal may be played back via the speaker 810. If the received signal is data (e.g., Internet information), the received signal may be sent to the microprocessor 850 where necessary processing (e.g., A/D conversion, decoding, or formatting) may be performed. In some embodiments, certain programs may be stored in the RAM 860 or the flash memory 855 and may be invoked and executed to process received information and to display the processed information on the display 825.

Optionally, the mobile station 800 may include a GPS receiver 845. When the GPS receiver 845 receives information from a satellite (not shown), such information may also be sent to the microprocessor 850 where appropriate instructions/programs are executed with respect to the GPS information and may subsequently display such GPS information either on the display 825 or through the speaker 810 (subject to suitable security considerations and protective measures). Such information may also be played back through the speaker 810 using, e.g., text to speech (TTS), which may be carried out by the microprocessor 850.

In venue based device control operation, according to the present teaching, the mobile station 800 includes sensor(s) that are receptive to some controlled quasi-transient signals (CQTS). In some embodiments, the mobile station 800 may utilize components normally present in a conventional mobile station as a CQTS receptor. For example, the microphone 815 may be used as a CQTS receptor when the venue existing signal source is a sound signal, either audible or not audible. To obtain venue relevant information coded in a CQTS, the CQTS sensed by the microphone 815 may be sent to the demodulator 2 870 to detect and demodulate the controlled quasi-transient signal. Detection and demodulation of the CQTS can be made more robust, for example, by phase locking the CQTS to the venue's underlying VESS.

The demodulator 2 870 may contain some appropriate filter, amplifier, or A/D converter so that digital information may be extracted from the received CQTS information. Such extracted digital information may be further sent to the microprocessor 850 to be decoded or interpreted. If, for example, the received venue relevant information is a command, instructing the mobile station 800 to turn off its ringer, the microprocessor 850 may interpret the information as such and then take appropriate actions by sending an instruction to the ringer unit 880, which controls a ringer speaker 885. Such interpretation or control may be performed by the microprocessor 850 based on certain programs stored in the RAM 860 or flash memory 855. Alternatively, in a networked mode, the microprocessor 850 may control to transmit the interpreted venue relevant information to a server across a network via the transceiver 835. When a device control command is received by the transceiver 835 from the network, it is forwarded to the microprocessor 850, which may then carry out the device control command, e.g., turn off the ringer, by sending an instruction to the ringer unit 880.

As described herein, a speaker is known being able to be used "in reverse" as a sensor to sound. In some embodiments, the speaker 810 may be used as a CQTS receptor. In this operational mode, the sensed sound CQTS is sent to the demodulator 1 865, which may include appropriate filter, amplifier, or A/D converter. The demodulated and A/D converted signal from the demodulator 1 865 is sent to the microprocessor 850, as in the case for demodulator 2 870.

Alternatively, the mobile station 800 may also be made capable of receiving electric field, magnetic field, and electromagnetic CQTS by using the housing of the mobile station as a receptor. In some embodiments, the surface of the mobile device's housing 801 may have a layer of electrode coating to allow receipt of CQTS contactlessly imparted on a human body (e.g., the user of the mobile station 800) when the coating is in contact with the human body. For example, there may be an electrode coating for ear-contact on the housing surface near where the earpiece speaker 810 is located. Similarly, there may be an electrode coating on the housing surface near where the user holds or touches the device, or where microphone 815 is located. Optionally, the front surface of the mobile station 800, e.g., where the keypad and display are located, may also be coated. In this manner, when the user of the mobile station 800 is, e.g., holding the mobile station, listening by putting the speaker near the user's ear and putting the user's mouth in proximity with the electrode coated microphone, the electrode coating, which is in connection with the CQTS receiver 840, enables the mobile station 800 to receive or couple to the CQTS that is contactlessly imparted on the user's body. When the CQTS receiver 840 receives or couples to the CQTS, it may forward the signal to the demodulator 3 875, which may include appropriate filter, amplifier, or A/D converter so that digital information coded in the CQTS can be extracted.

Each of such quasi-transient receptors may have its own demodulator. In this way, each receptor may independently receive CQTS. By designing each such sensor in a way so that they each sensitive to a different type of low-average-power transient signal from a different source, the mobile station 800 may be capable of receiving venue relevant information from different sources to improve the quality and robustness. In some embodiments, different receptors may also share a demodulator. In this case, the demodulator may be designed to be effective with respect to different frequency ranges suitable to each receptor. Future advancements in the state of the art such as in the development of new types of receptors or transducers, improvements in the characteristics or sensitivity of same, and in the detection, demodulation and/or processing of minuscule signals in noisy environments are anticipated for use in the applications, methods and systems taught herein.

In some embodiments, the CQTS receiver 840 and the transceiver 835 may correspond to the same component, if the frequency range of each can be covered by the shared component. Similarly, the transceiver 835, the CQTS receiver 840, and the GPS receiver 845 may all correspond to the same component if the shared component has a coverage in frequency that is adequate to include the frequency ranges of all these three individual components.

While the inventions have been described with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

I claim:

1. A method for a controllable device, comprising steps of:
    receiving a controlled quasi-transient signal superimposed on a venue-intrinsic signal propagated in the air or through distance in a venue where a controllable device is, wherein:
    (a) the venue-intrinsic signal is emitted from infrastructure intrinsic to the venue and is otherwise unintended for wireless communication via the infrastructure with the controllable device, wherein the venue-intrinsic signal includes at least one of an electric signal emitted by a utility line or by an electric wire,
    (b) the controlled quasi-transient signal comprises a quasi-transient signal coded with venue-relevant information, and
    (c) the controlled quasi-transient signal is a signal generated for application to the venue-intrinsic signal for emission from the infrastructure intrinsic to the venue as one or more fast rise-time bursts with spectral and power density characteristics similar to the uncontrolled transients of the venue-intrinsic signal;
    extracting the venue-relevant information, associated with the venue where the controllable device is, from the controlled quasi-transient signal; and
    controlling at least one function of the controllable device in accordance with a control signal generated based on the venue-relevant information, wherein the venue-relevant information corresponds to a geographic region related to the venue.

2. The method according to claim 1, wherein the venue-intrinsic signal further includes at least one of:
    a sound wave;
    an electric signal emitted by utility supply equipment;
    an electric signal emitted by an electric wire;
    an electric signal emitted by an electric entity; and
    a signal reflected by an entity.

3. The method according to claim 1, wherein the venue-relevant information includes at least one of:
    a physical address of the venue;
    a classification of the venue; and
    a control requirement associated with the venue.

4. The method according to claim 3, wherein the physical address of the venue includes at least one of:
    a postal address;
    a building description;
    floor information; and
    room information.

5. The method according to claim 3, wherein the classification of the venue includes:
    a classification of a public locale; and
    a classification of a private a classification of a non-public and non-private locale.

6. The method according to claim 5, wherein the classification of a public locale includes at least one of:
    a theater;
    a church;
    a school or classroom;
    a hospital;
    an airport;
    a bus station;
    a public transportation vehicle;
    a place of business; and
    a government owned property.

7. The method according to claim 5, wherein the classification of a private locale includes at least one of:
    a private residence;
    a private school or classroom;
    a private business place; and
    a privately owned property.

8. The method according to claim 3, wherein the control requirement associated with a venue includes at least one of:
- mandatory on/off status directed at one or more components of the device;
- mandatory device on/off;
- mandatory device self-identification;
- mandatory device delivery of a message;
- conditional on/off status directed at one or more components of the device;
- conditional device on/off;
- conditional device self-identification; and
- conditional device delivery of a message.

9. The method according to claim 3, wherein:
the message is an alert signal sent to the device by an authority associated with the venue; and
the alert signal is delivered to warn an emergent situation.

10. The method according to claim 9, wherein the control requirement associated with the venue has one or more associated exceptions, including an exception, associated with a requirement of mandatory device on/off, for an emergency connection made by either the device to a third party or by a third party to the device.

11. The method according to claim 1, wherein the control signal is generated by the device based on the venue-relevant information.

12. The method according to claim 1, wherein the control signal is generated by an external control unit outside of the device, wherein the controlling comprises:
- transmitting the venue-relevant information to an external control decision unit via a network;
- receiving the control signal generated by the external control decision unit based on the venue-relevant information via the network; and
- operating the device based on the received control signal.

13. The method according to claim 12, wherein the external control decision unit is operated by at least one of:
- a network operator;
- a service provider; and
- a third party service provider.

14. The method according to claim 1, wherein the control signal provides an operational instruction to the device.

15. The method according to claim 14, wherein the operational instruction includes at least one of:
- an instruction to direct the device to switch its operational mode to non-operational and vice-versa;
- an instruction to direct the device to transmit its identification information;
- an instruction to direct the device to deliver a message;
- an instruction to direct the device to switch its operational mode to non-operational and vice-versa when a given condition is met;
- an instruction to direct the device to transmit its identification information when a given condition is met; and
- an instruction to direct the device to deliver a message when a given condition is met.

16. The method according to claim 15, wherein the operational instruction is provided based on at least one of:
- the identity of the device;
- the identity of a user associated with the device;
- the nature of the message; and
- a profile characterizing a user associated with the device.

17. The method according to claim 1, further comprising processing, by the device, the controlled quasi-transient signal to:
- demodulate the controlled quasi-transient signal with reference to the venue-intrinsic signal source; and
- decode the demodulated quasi-transient signal to obtain the venue relevant information.

18. A method, comprising steps of:
receiving, by a controlled quasi-transient signal receptor in a controllable device, a controlled quasi-transient signal superimposed on a venue-intrinsic signal propagated in the air or through distance in a venue, wherein:
(a) the venue-intrinsic signal is emitted from infrastructure intrinsic to the venue, the venue-intrinsic signal includes at least one of an electric signal emitted by a utility line or by an electric wire and is otherwise unintended for wireless communication with the controllable device;
(b) the controlled quasi-transient signal comprises a quasi-transient signal coded with venue-relevant information, and
(c) the quasi-transient signal is a signal generated for application to the venue-intrinsic signal for emission as one or more fast rise-time bursts with spectral and power density characteristics similar to uncontrolled transients of the venue-intrinsic signal; extracting the venue-relevant information from the controlled quasi-transient signal; transmitting the venue-relevant information over a wireless network via a transceiver of the controllable device to a server, wherein the controllable device transceiver is coupled to the wireless network; and
in response to the transmitted venue-relevant information, receiving, by the controllable device transceiver, a control signal sent over the wireless network, wherein the venue-relevant information corresponds to a geographic region related to the venue; and
in response to the received control signal, controlling the controllable device in accordance with the control signal.

19. The method according to claim 18, wherein:
the venue intrinsic signal includes at least one of:
- a sound wave,
- an electric signal emitted by a utility wire,
- an electric signal emitted by utility supply equipment,
- an electric signal emitted by an electric wire,
- an electric signal emitted by an electric entity, and
- a signal reflected by an entity; and the venue-relevant information includes at least one of:
- a physical address of the venue,
- a classification of the venue, and
- a control requirement associated with the venue.

20. The method according to claim 18, wherein:
the physical address of the venue includes at least one of:
- a postal address,
- a building description;
- floor information associated with a physical address, and
- room information associated with a physical address;

the classification of the venue includes at least one of:
- a classification of a public locale, and
- a classification of a private locale; and the control requirement associated with venue includes at least one of:

mandatory device on/off,
mandatory on/off status of one or more components of the device,
mandatory device self-identification,
mandatory device delivery of a message,
conditional device on/off,
conditional on/off status of one or more components of the device,
conditional device self-identification, and
conditional device delivery of a message.

21. A method for delivering information, comprising steps of:
obtaining venue relevant information to be delivered to a controllable device located in a venue to which the venue relevant information is relevant;
identifying a venue-intrinsic signal to be emitted from infrastructure intrinsic to the venue and propagated in the air or through distance, wherein emission of the venue-intrinsic signal from the infrastructure is otherwise unintended for use within a wireless network, wherein the venue-intrinsic signal includes at least one of an electric signal emitted by a utility line or an electric signal emitted by an electric wire;
generating a controlled quasi-transient signal, wherein:
(a) the controlled quasi-transient signal comprises a quasi-transient signal coded with the information to be delivered via the infrastructure intrinsic to the venue, and
(b) the quasi-transient signal is a signal generated for application to the venue-intrinsic signal for emission as one or more fast rise-time bursts with spectral and power density characteristics similar to uncontrolled transients of the venue-intrinsic signal; and
coupling the quasi-transient signal coded with the information to be delivered with the venue-intrinsic signal via the infrastructure intrinsic to the venue so that the information is propagated in the air or through distance, in the venue.

22. The method according to claim 21, wherein the venue-intrinsic signal includes at least one of:
a sound wave;
an electric signal emitted by a utility wire;
an electric signal emitted by utility supply equipment;
an electric signal emitted by an electric wire;
an electric signal emitted by an electric entity; and
a signal reflected by an entity.

23. The method according to claim 21, wherein the information to be delivered includes venue-relevant information associated with the venue corresponding to a geographical region in which the information is delivered.

24. The method according to claim 23, wherein the venue-relevant information includes at least one of:
a physical address of the venue;
a classification of the venue; and
a control requirement associated with the venue.

25. The method according to claim 24, wherein the physical address of the venue includes at least one of:
a postal address;
a building description;
floor information; and
room information.

26. The method according to claim 24, wherein the classification of the venue includes:
a classification of a public locale; and
a classification of a private locale.

27. The method according to claim 24, wherein the control requirement associated with the venue includes at least one of:
mandatory device on/off;
mandatory on/off status of one or more components of a device;
mandatory device self-identification;
mandatory device delivery of a message;
conditional device on/off;
conditional on/off status of one or more components of a device;
conditional device self-identification; and
conditional device delivery of a message.

28. The method according to claim 1, wherein the controllable device is a mobile station.

29. The method according to claim 28, wherein the venue-relevant information includes at least one of:
a physical address of the venue;
a classification of the venue; and a control requirement associated with the venue.

30. The method according to claim 28 wherein the receiving is performed through a sensing device residing in the mobile station.

31. The method according to claim 30, wherein the sensing device includes at least one of a microphone, a speaker used in reverse, and an earpiece in the mobile station.

32. The method according to claim 28, wherein the receiving is performed through at least one of:
a transceiver;
an electrode; and
a transducer.

33. The method according to claim 31, wherein the receiving is performed via the sensing device of at least one of:
an electric field;
a charge;
a magnetic field; and
an electromagnetic field.

34. The method according to claim 28, wherein the control signal instructs the mobile station to receive content selected in accordance with the venue relevant information.

35. The method according to claim 34, wherein the selected content includes at least one of an advertisement, a reward, a discount offer, and special content specific to the venue and/or to the identity of the mobile station.

36. The method according to claim 28, wherein the venue-intrinsic signal includes at least one of:
a sound wave;
an electric signal emitted by a utility line;
an electric signal emitted by utility supply equipment;
an electric signal emitted by an electric wire;
an electric signal emitted by an electric entity; and
a signal reflected by an entity.

37. A mobile station, comprising:
a transceiver for sending and receiving signals via a wireless network;
a controlled quasi-transient signal receptor, for receiving a controlled quasi-transient signal superimposed on a venue-intrinsic signal propagated via infrastructure of a venue in which the mobile station is in the air or through distance in a venue where the device is, wherein:
(a) the venue-intrinsic signal is emitted from an entity intrinsic to the venue, the venue-intrinsic signal includes at least one of an electric signal emitted by a utility line or by an electric wire and is otherwise unintended for wireless communication with the device, (b) the controlled quasi-transient signal comprises a quasi-transient signal coded with venue-relevant information, and (c) the quasi-transient signal is a signal generated for application to the venue-intrinsic signal for emission as one or more fast rise-time bursts with spectral and power density characteristics similar to uncontrolled transients of the venue-intrinsic signal;

a controlled quasi-transient signal processor, coupled to the controlled quasi-transient signal receptor, for processing the received controlled quasi-transient signal superimposed on a venue-intrinsic signal;

a controlled quasi-transient signal decoder, coupled to the controlled quasi-transient signal processor, for extracting the venue-relevant information, associated with the venue where the device is, from the processed controlled quasi-transient signal; and a device controller responsive to the extracted venue-relevant information, wherein the venue corresponds to a geographic region.

38. The mobile station as in claim 37, wherein the device controller is configured for controlling at least one function of the device in accordance with a control signal generated based on the venue-relevant information.

39. The mobile station as in claim 37, wherein the device controller is configured for controlling the device to perform functions, comprising functions to:

transmit the extracted venue-relevant information over a network;

receive a control signal sent over the network in response to the transmitted venue-relevant information; and control the device in accordance with the received control signal.

40. A system, comprising:

a venue entity comprising one or more electrical conductors, electric circuits, wiring, fixtures, electrical equipment, or appliances installed within a venue;

a source of venue relevant information to be delivered to a mobile station located within the venue; and a controlled quasi-transient signal generator, coupled to the venue entity and the source of venue relevant information, configured to:

receive the venue relevant information from the venue relevant information source;

couple a quasi-transient signal coded with the venue relevant information;

and generate a controlled quasi-transient signal by superimposing the quasi-transient signal coded with the venue relevant information on a venue-intrinsic signal, wherein the venue-intrinsic signal includes at least one of an electric signal emitted by a utility line or by an electric wire; and output the generated, controlled quasi-transient signal to the venue entity.

\* \* \* \* \*